Sept. 15, 1953

J. L. STERLING

WIRE RECORDING STORAGE MECHANISM FOR BOOKKEEPING MACHINES 2,652,196

Filed May 20, 1949

16 Sheets-Sheet 1

INVENTOR.
JOHN L. STERLING
BY Robert H. Strother
ATTORNEY

Sept. 15, 1953 J. L. STERLING 2,652,196

WIRE RECORDING STORAGE MECHANISM
FOR BOOKKEEPING MACHINES

Filed May 20, 1949 16 Sheets-Sheet 2

Inventor
JOHN L. STERLING

By Robert H. Strother

Attorney

Sept. 15, 1953 J. L. STERLING 2,652,196

WIRE RECORDING STORAGE MECHANISM FOR BOOKKEEPING MACHINES

Filed May 20, 1949 16 Sheets-Sheet 3

INVENTOR
JOHN L. STERLING
BY Robert H. Strother
Attorney

INVENTOR.
JOHN L. STERLING
BY Robert H. Strother
Attorney

Sept. 15, 1953 J. L. STERLING 2,652,196

WIRE RECORDING STORAGE MECHANISM
FOR BOOKKEEPING MACHINES

Filed May 20, 1949 16 Sheets-Sheet 5

INVENTOR
JOHN L. STERLING
BY Robert H. Strother
Attorney

Sept. 15, 1953 J. L. STERLING 2,652,196

WIRE RECORDING STORAGE MECHANISM FOR BOOKKEEPING MACHINES

Filed May 20, 1949 16 Sheets-Sheet 6

INVENTOR.
JOHN L. STERLING
BY Robert H. Strother
ATTORNEY

Sept. 15, 1953

J. L. STERLING

WIRE RECORDING STORAGE MECHANISM FOR BOOKKEEPING MACHINES 2,652,196

Filed May 20, 1949

16 Sheets-Sheet 7

INVENTOR.
JOHN L. STERLING

BY Robert H. Strother

ATTORNEY

INVENTOR.
JOHN L. STERLING
BY Robert H. Strother
ATTORNEY

Sept. 15, 1953 J. L. STERLING 2,652,196

WIRE RECORDING STORAGE MECHANISM FOR BOOKKEEPING MACHINES

Filed May 20, 1949 16 Sheets-Sheet 9

INVENTOR.
JOHN L. STERLING

BY Robert H. Strother

ATTORNEY

Sept. 15, 1953

J. L. STERLING
WIRE RECORDING STORAGE MECHANISM
FOR BOOKKEEPING MACHINES 2,652,196

Filed May 20, 1949

16 Sheets-Sheet 10

INVENTOR.
JOHN L. STERLING
BY Robert H. Strother
ATTORNEY

Sept. 15, 1953 J. L. STERLING 2,652,196

WIRE RECORDING STORAGE MECHANISM FOR BOOKKEEPING MACHINES

Filed May 20, 1949 16 Sheets-Sheet 11

INVENTOR.
JOHN L. STERLING

BY R. H. Strother

ATTORNEY

Sept. 15, 1953 J. L. STERLING 2,652,196

WIRE RECORDING STORAGE MECHANISM FOR BOOKKEEPING MACHINES

Filed May 20, 1949 16 Sheets-Sheet 12

INVENTOR.
JOHN L. STERLING
BY Robert H. Strother
ATTORNEY

INVENTOR.
JOHN L. STERLING
BY Robert H. Strother
ATTORNEY

Sept. 15, 1953

J. L. STERLING

WIRE RECORDING STORAGE MECHANISM FOR BOOKKEEPING MACHINES 2,652,196

Filed May 20, 1949

16 Sheets-Sheet 14

INVENTOR
JOHN L. STERLING

BY Robert H. Strother
Attorney

Sept. 15, 1953

J. L. STERLING
WIRE RECORDING STORAGE MECHANISM
FOR BOOKKEEPING MACHINES 2,652,196

Filed May 20, 1949

16 Sheets-Sheet 15

INVENTOR.
JOHN L. STERLING

BY Robert H. Strother

ATTORNEY

Sept. 15, 1953

J. L. STERLING

WIRE RECORDING STORAGE MECHANISM FOR BOOKKEEPING MACHINES 2,652,196

Filed May 20, 1949

16 Sheets-Sheet 16

INVENTOR.
JOHN L. STERLING

BY Robert H. Strother

ATTORNEY

Patented Sept. 15, 1953 2,652,196

UNITED STATES PATENT OFFICE 2,652,196

WIRE RECORDING STORAGE MECHANISM FOR BOOKKEEPING MACHINES

John L. Sterling, Bellerose, N. Y., assignor to Remington Rand Inc., New York, N. Y., a corporation of Delaware Application May 20, 1949, Serial No. 94,324

24 Claims. (Cl. 235—61.9)

This invention relates to business machines, and more particularly to an accounting machine in which a plurality of balances may be stored, selectively entered into an accumulator, amounts subtracted and added to said balance, and the new balance returned to the storage mechanism.

In the past balances have been entered on ledger sheets in a manner permitting them to be sensed and picked up later to actuate an accumulator, thus obviating the necessity of the operator copying the old balance and possibly making an error. Another system entailed the punching of the balance in a separate card which was attached to the ledger and later sensed to enter the old balance. Often the card was misplaced which required that the old balance be copied in by the operator.

It is the principal object of the invention to provide a storage mechanism for old balances in which the amounts are entered by magnetic impulses in a tape or the like, which balances may be selectively withdrawn and entered in an accumulator without intervention of the operator.

Another object is to provide electrical circuits over which balances read out of an accumulator may be entered in the form of magnetic impulses in a tape or the like, without intervention of the operator.

A further object of the invention is to provide a selecting mechanism whereby a desired balance may be selected from a plurality of balances under control of a sensing mechanism.

A still further object is to provide a sensing mechanism which will be actuated by data in a ledger sheet, and control a selecting mechanism for selecting the balance corresponding to that data.

Another object is to provide a device whereby any one of a plurality of balances recorded in a tape or the like by magnetic impulses may be selected and read out into an accumulator.

Another object is to provide electrical circuits for controlling the selection of any one of a plurality of balances recorded by magnetic impulses in a wire or tape, reading said balance and entering it into an accumulator.

A still further object is to provide an accounting machine in which an amount recorded in a magnetic tape or wire is automatically read out into the machine, and a new amount automatically read out of the machine and re-recorded in the tape.

A feature of the invention comprises a plurality of tapes wound on drums each tape capable of being magnetized by magnetic impulses to represent a balance in a particular account.

Another feature is the provision of a sensing mechanism for sensing an account number from a ledger sheet or the like, which sensing mechanism controls electrical circuits which, in turn, control a travelling carriage for selecting the particular tape containing the balance of the desired account.

A further feature is the electrical circuits whereby the magnetic impulses in the selected tape are caused to set one or more accumulators to the amount standing in the tape and print the same amount.

A still further feature is the electrical circuits whereby an amount standing in the accumulators of a bookkeeping machine is entered as magnetic impulses into a tape.

The preferred form of the invention comprises a plurality of tapes wound on drums carried on rotating shafts, which tapes are capable of being magnetized by impulses from a cross totalizer. Each drum contains a balance which has been previously entered and may be selected by a carriage carrying a reading and recording head. The selecting carriage is under control of a sensing mechanism which senses the number of the desired account from perforations in a ledger sheet carrying the past transactions. Upon selection the balance is read out of the tape by the reading head and entered in an accumulator and cross totalizer. Any number of transactions may then be entered in the machine manually, and a new balance obtained. This new balance is then read out of the cross totalizer and recorded through the recording head as magnetic impulses in the tape.

The recording of data by magnetic impulse on a tape or wire is taught by the patent to V. Poulsen 661,619 November 13, 1900, and many others. The bookkeeping machine disclosed in the drawings is similar to that disclosed and described in the patents to E. O. Roggenstein 2,364,758, December 12, 1944, F. W. Schremp 2,288,846, July 7, 1942, and Dodge et al. 2,064,154, December 15, 1936.

A more clear conception of the operation, construction, and further objects of the invention may be had from the following specification when read in the light of the accompanying drawing, in which Fig. 1 is an isometric view of the invention showing the bookkeeping machine and storage unit;

Figures 10, 11, 12, 13, 14:
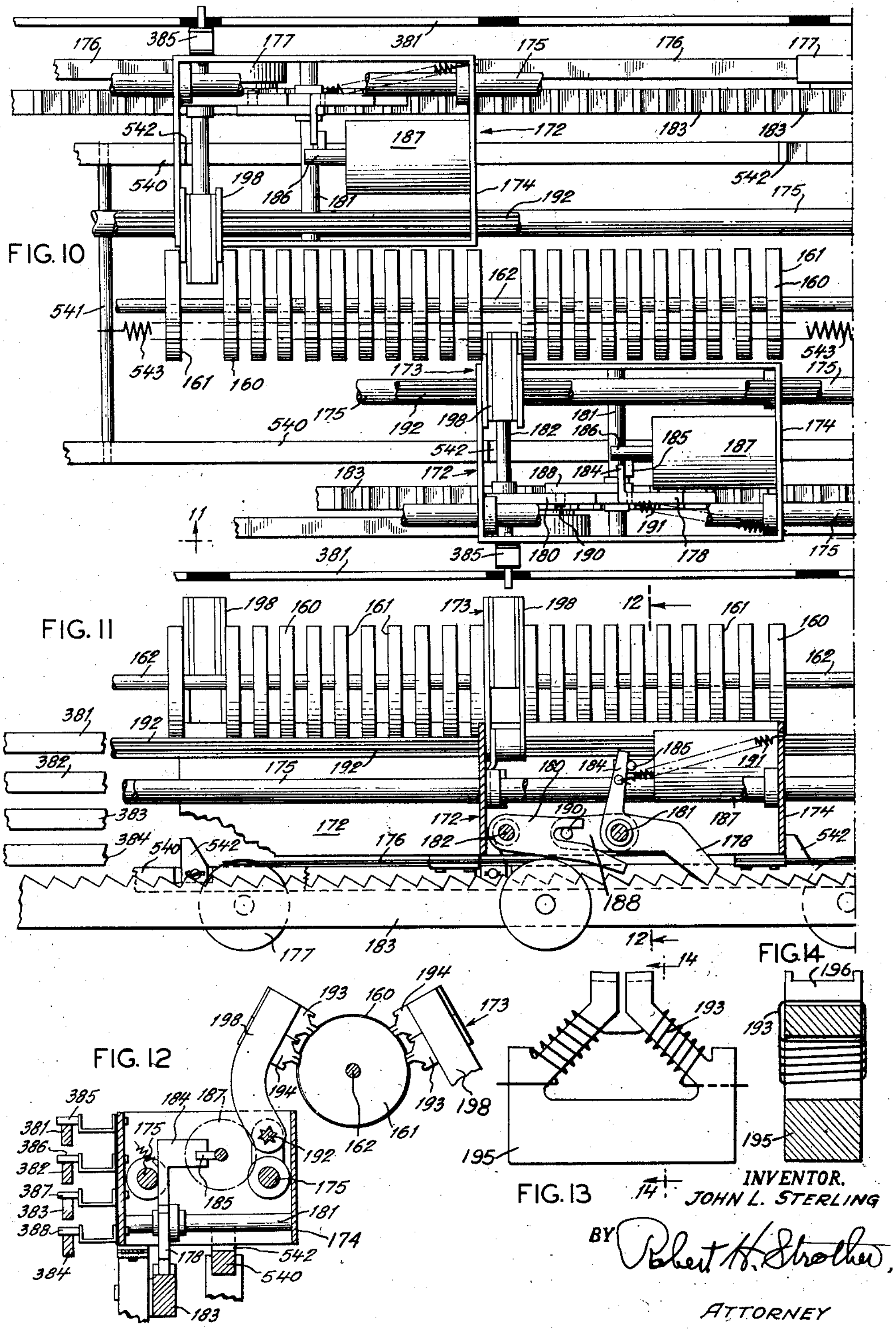
Figure 10A:
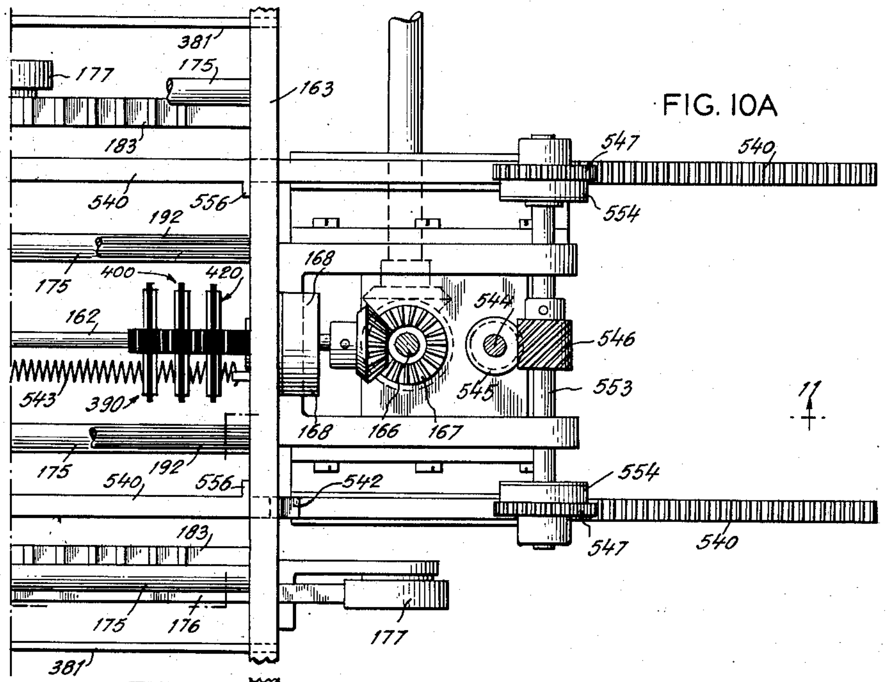
Figure 11A:
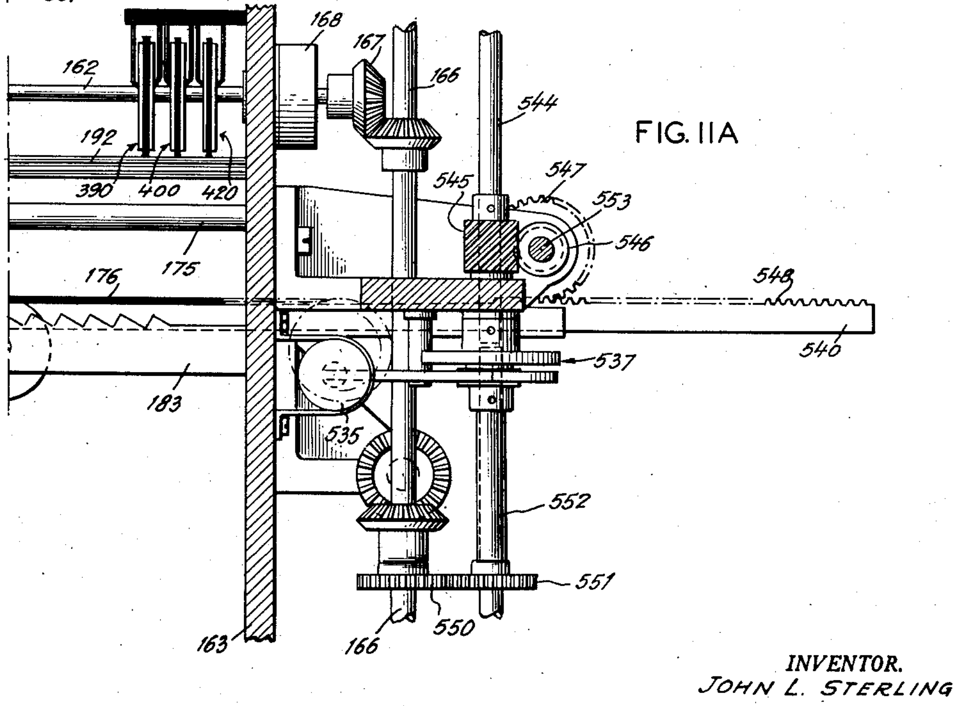
Figure 15:
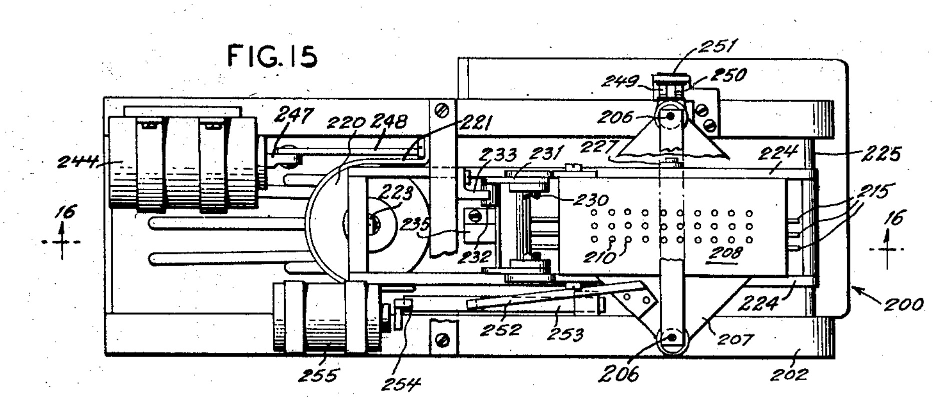
Figure 16:
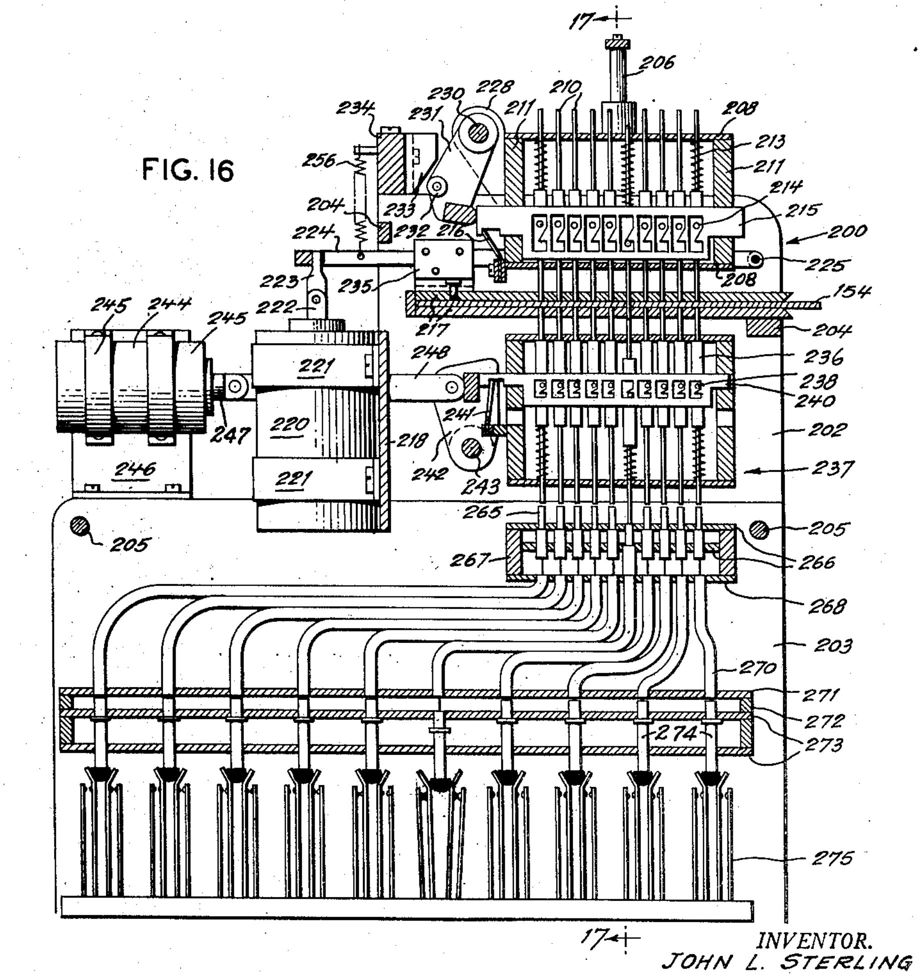
Figures 17, 28, 29:
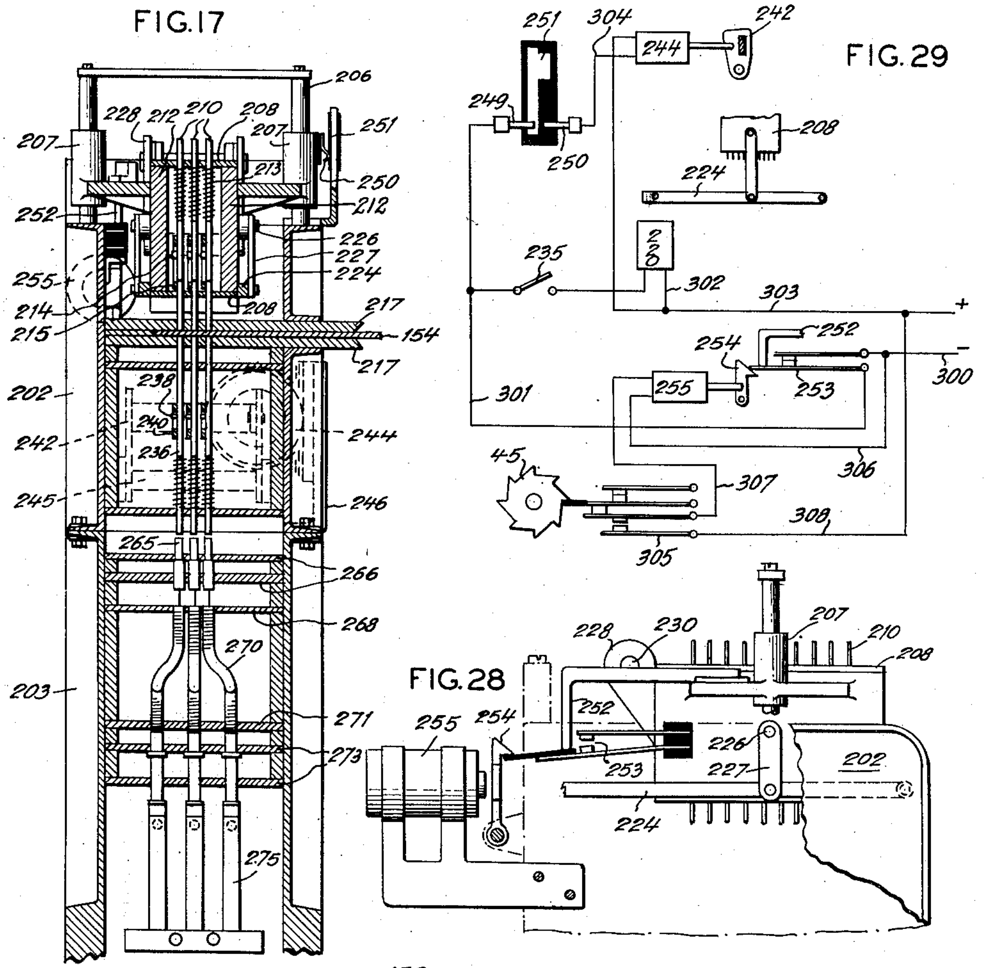
Figure 30:
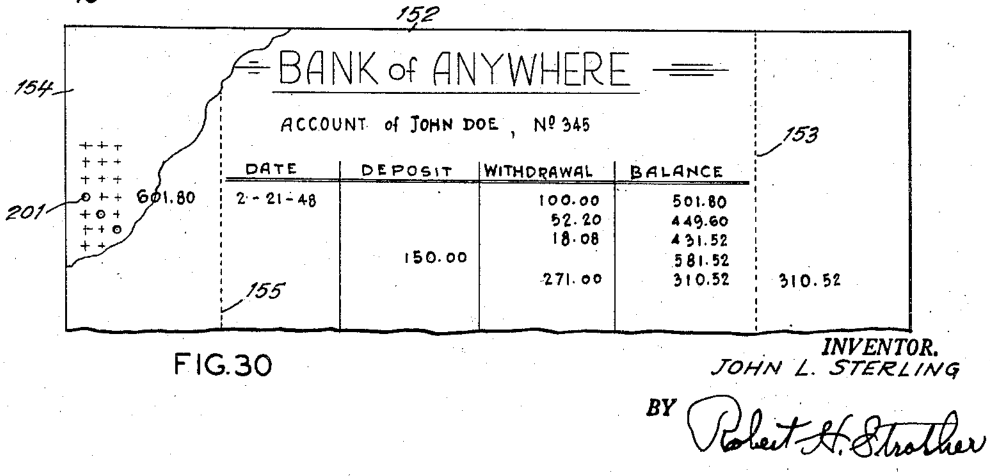
Figure 18:
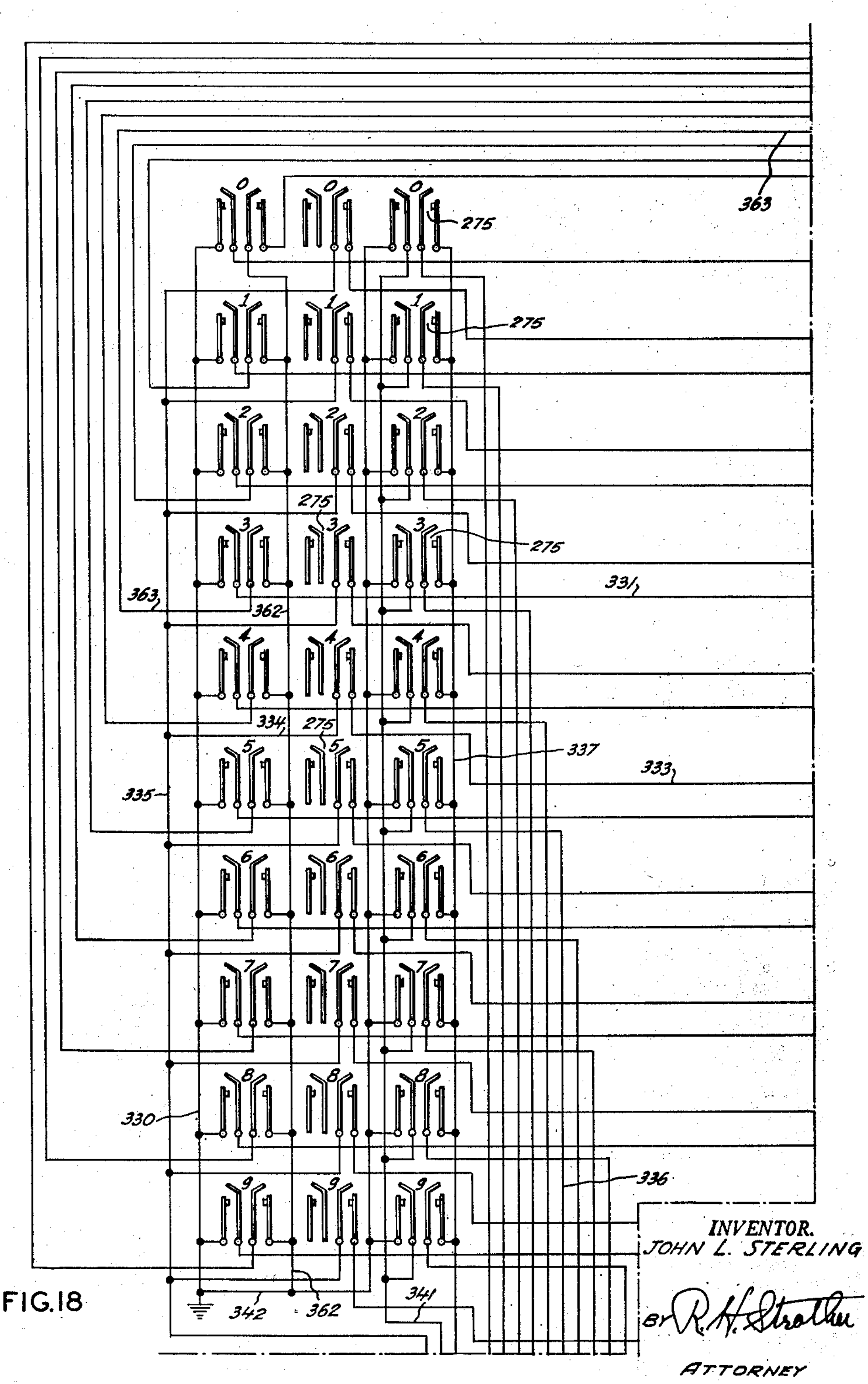
Figure 19:
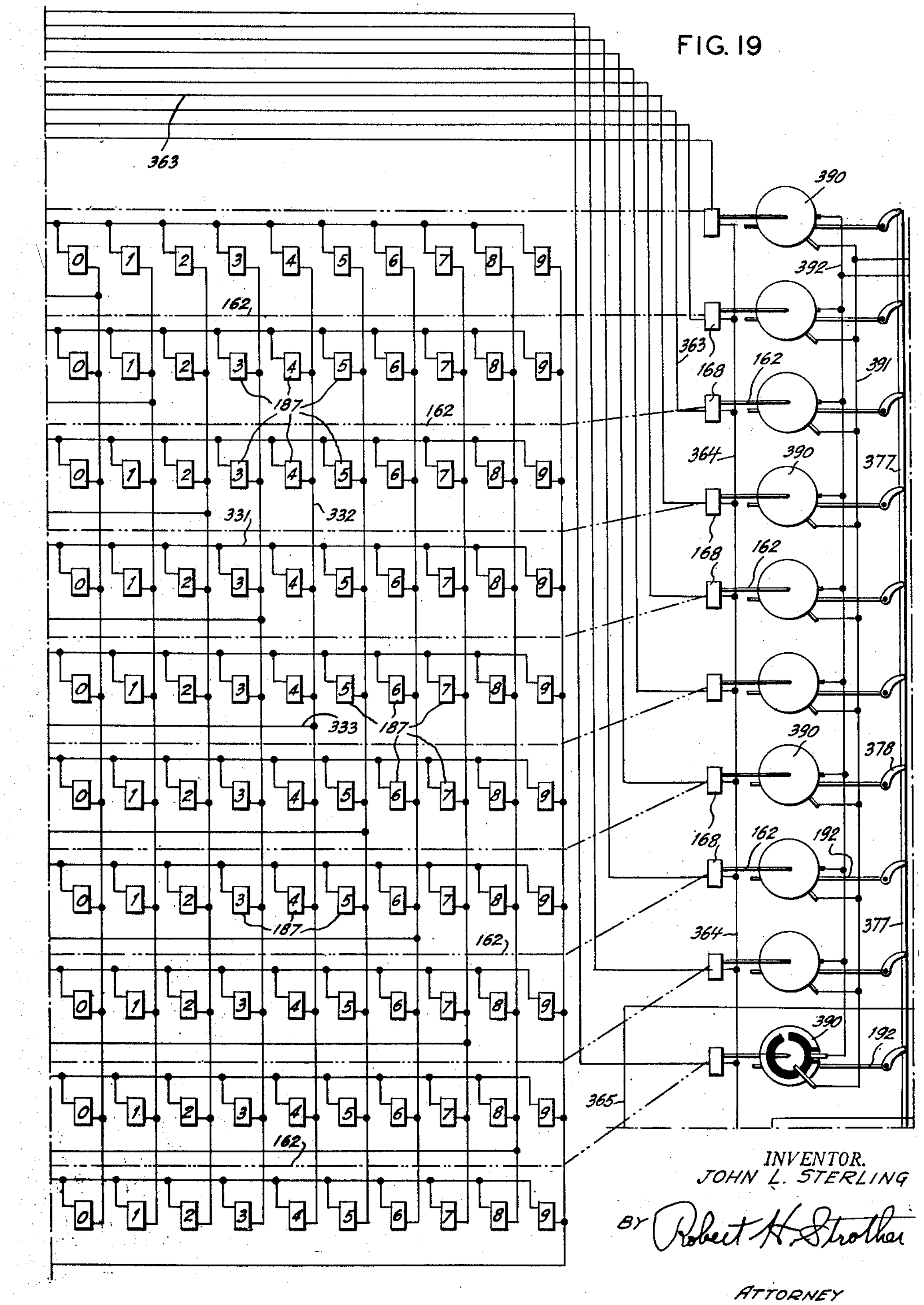
Figures 20, 24, 25, 26, 27:
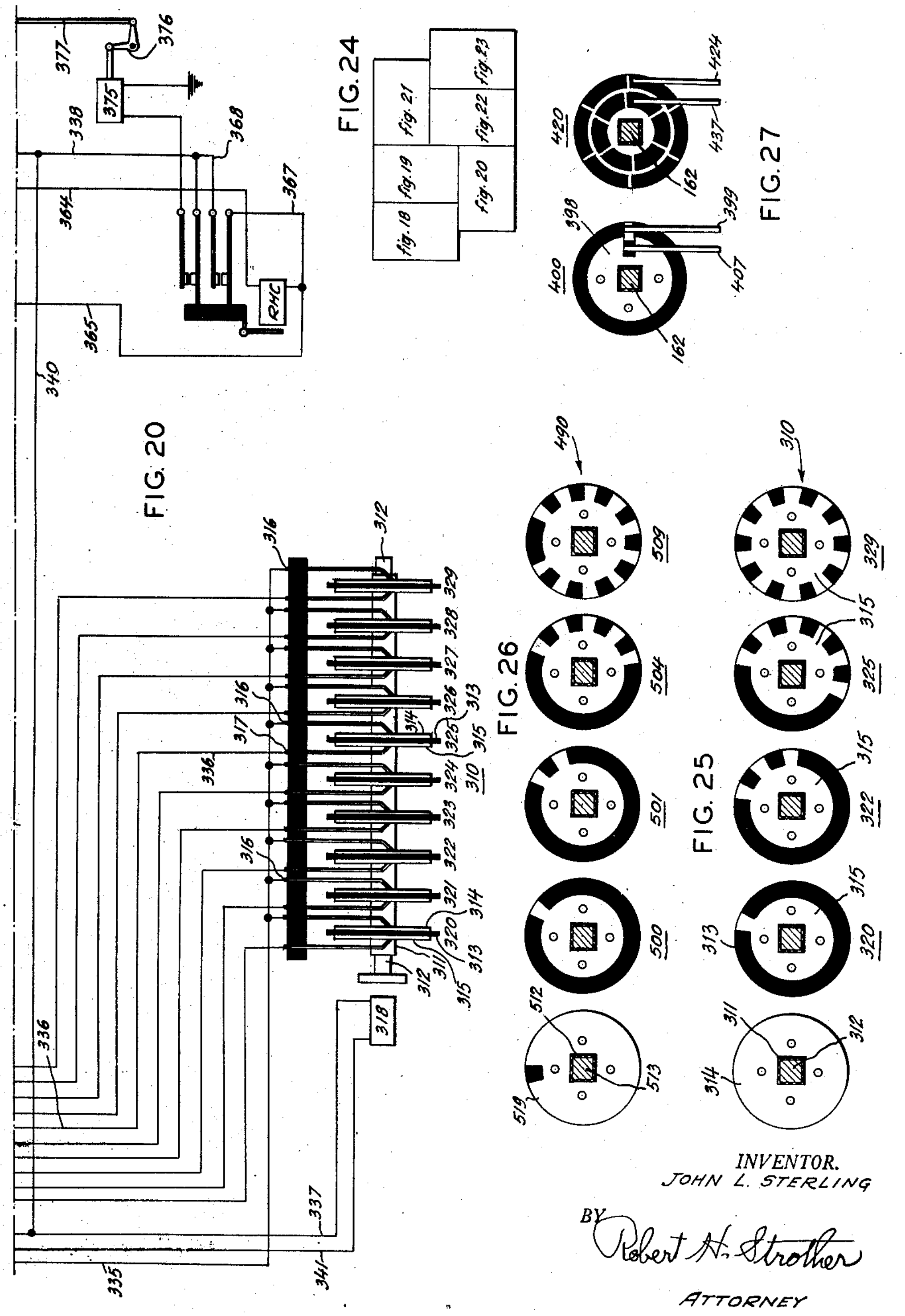

Figs. 10 and 10A combined form a plan view of a portion of the magnetic tapes and the selecting carriage in the magnetic storage device;

Figs. 11 and 11A combined form a front elevation of Figs. 10 and 10A;

Fig. 12 is a cross section taken along line 12—12 of Fig. 11 showing the reading and recording heads in the magnetic storage device;

Fig. 13 is a detail front view of a magnet coil as used in the magnetic reading or recording heads;

Fig. 14 is a cross section taken along line 14—14 of Fig. 13;

Fig. 15 is a plan view of the sensing mechanism for controlling the account selecting carriage;

Fig. 16 is a cross section taken along line 16—16 of Fig. 15;

Fig. 17 is a vertical cross section taken along line 17—17 of Fig. 16;

Figs. 18, 19, 20, 21, 22, and 23 combined in accordance with Fig. 24 form a wiring diagram of the invention;

Fig. 24 is a schematic diagram for combining Figs. 18 to 23 inclusive;

Fig. 25 shows the construction of the commutators in the pulsing circuit for the magnetic disc selecting mechanism;

Fig. 26 shows the commutators in the pulsing circuit for the balance read out device;

Fig. 27 shows the commutators for controlling a rotary switch and impulses to the print solenoids;

Fig. 28 is a detail view of the solenoid for controlling the ledger card sensing pin mechanism for account selection;

Fig. 29 is a schematic diagram of the operating circuit for the ledger card sensing mechanism; and Fig. 30 is a fragmentary view of a ledger sheet and a statement.

The invention resides in the combination of a bookkeeping machine on which bills, statements and the like may be made with a magnetic storage device wherein old balances may be stored. There is also provided a sensing mechanism whereby an account number punched in the ledger sheet on which the transactions are to be entered is sensed and the portion of the magnetic storage device containing the old balance in that account may be selected.

If, for example, a bank statement is to be made out, as will be described in detail later, the particular ledger sheet for that account is inserted in the sensing mechanism and circuits are set up selecting the particular drum in the storage unit which carries the present or old balance in that account. After the drum is selected the ledger sheet and customer's statement are placed on the platen of the bookkeeper and the carriage is positioned at its extreme right hand position or with the first vertical totalizer in the entering position. The operator now actuates a reading and erasing key for magnetic readout devices and a start key which activates all circuits. The old balance is read out of the previously selected drum and by actuating one of a set of ten numeric solenoids causes the old balance to be entered in the vertical totalizer located at that carriage position, into the cross footer and prints the amount on the statement and ledger. The magnetic storage device while still connected has no further function until the total is later read out. The carriage is then tabulated to align the debit or credit accumulator with the entering mechanism and the amount or amounts of the present transaction are entered by the keyboard.

All amounts entered additively in the vertical totalizers or accumulators are entered in the cross totalizer additively and vice versa. When the present transactions have been completed the carriage is tabulated to the total read out position. In this position the circuits to the magnetic storage are again effective and the new balance is transferred as magnetic spots onto the drum from which the old balance has been erased and printed on the ledger and statement. In order to clear the vertical totalizers in which the present transactions have been entered a reverse key is actuated causing all those totalizers, which were set to add, to now subtract and vice versa. The carriage is moved to the entering position and the same amounts entered thus clearing the totalizers and placing them in condition for the next statement. The amount entered in the magnetic drum now becomes the old balance and remains until needed for a future statement.

Figures 1, 1A:
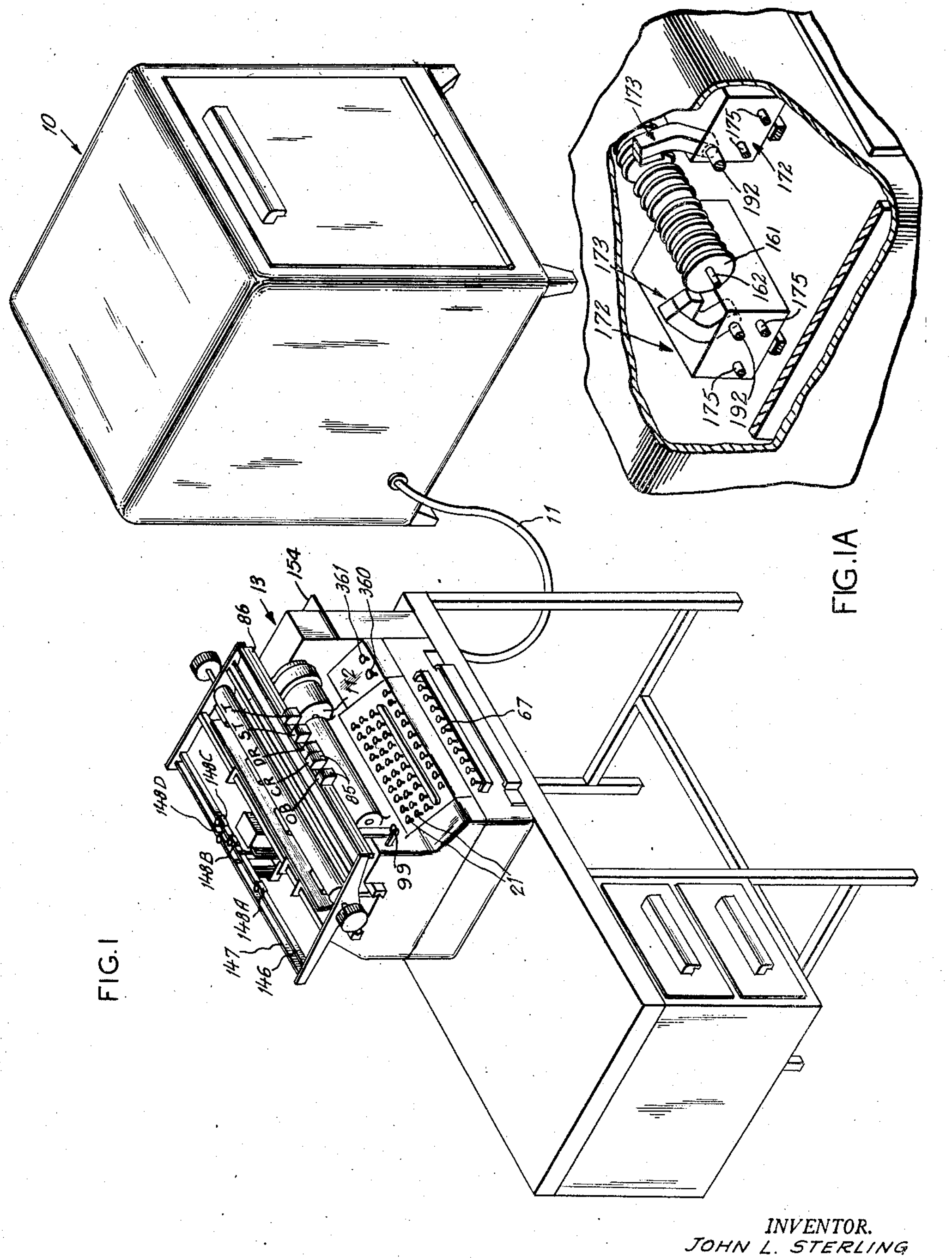
Fig. 1A is a detail showing of the magnetic storage elements.

In Fig. 1 is shown the preferred form of machine comprising a plurality of banks of storage devices housed in a casing 10. A cable 11 interconnects the circuits in the storage devices and the bookkeeping machine 12, which is similar in all respects to that described and disclosed in the patent to E. O. Roggenstein referred to above, and only those portions of the bookkeeping machine necessary to a complete understanding of the invention will be described. A sensing mechanism 13, for selecting a particular account is positioned alongside the bookkeeping machine and is connected to cable 11.

Figure 2:
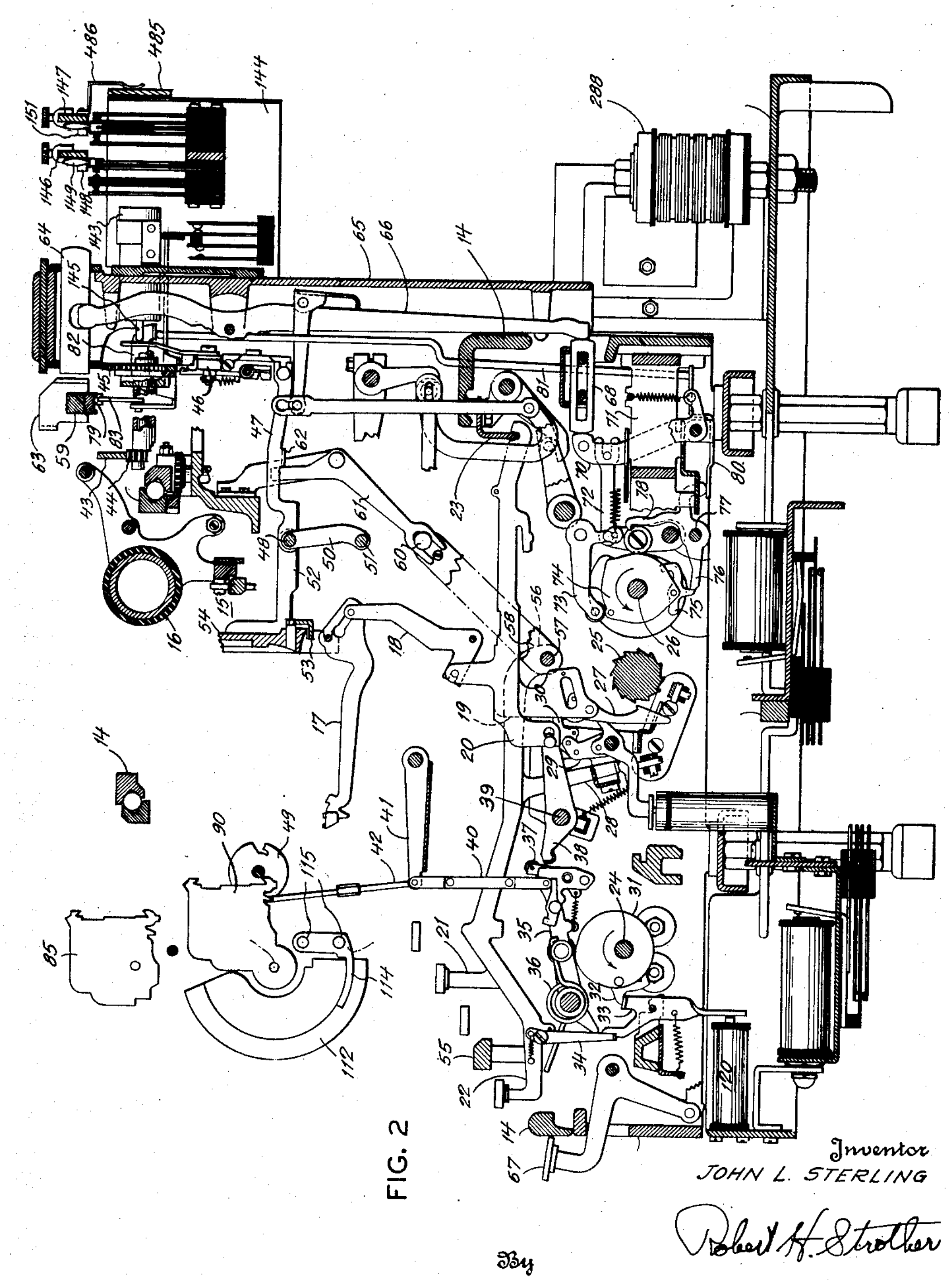
Fig. 2 is a cross section through the midsection of a bookkeeping machine.

Referring to Fig. 2, the machine comprises an electrified typewriter, fragments of the frame 14 being shown. The typewriter carriage 15, which is power driven, supports a platen 16. The type bars 17 are operated by sub-levers 18. The sublevers which operate alphabetic type bars are actuated by levers 19, and those which operate numerical type bars by levers 20, which, together with the alphabetic key levers 21 and the numerical key levers 22, are all pivoted on an angle bar 23 at the rear of the machine. All of the type bars are operated by a power drive including three continuously rotating shafts, namely, a shaft 24 for actuating the computing mechanism and the numerical type bars, a snatch roll 25 for operating the alpha type bars, and a third shaft 26 which operates the tabulating, backspacing, and carriage shift mechanisms. These three shafts are driven counterclockwise (Fig. 2) by any well known means, such as a motor.

Each of the alphabet type bar operating levers 19 has a hook 27 pivoted thereon and hanging down in front of the snatch roll 25. Each of the alphabet key levers 21 has a depending arm 28 adapted to rock a bell-crank 29 carrying a hook 30 engaging the upper portion of depending hook 27 in such fashion that when a key lever is depressed, the hook 27 is swung into engagement with the snatch roll 25, thus depressing the lever 19 and operating its associated alpha type bar.

Mounted on shaft 24 is a series of cams 31, one for each numeral key and type bar. Said cams are loose on the shaft and each has associated therewith a clutch, the dog 32 of which is adapted to engage a toothed wheel (not shown) fast on the shaft 24. The dog 32 is controlled by a latch 33 adapted to be tripped by a depending arm 34 pivoted to the associated numeral key lever 22, with the result that the dog 32 engages the toothed wheel and drives cam 31 for one revolution, at the end of which the dog is thrown out by engagement with the latch 33. Each cam controls a follower arm 35 urged downwardly by a strong spring 36. The shape of the cam is such that it rocks the follower 35 down and then up to its normal position. Pivoted to the arm 35 is a pawl 37, which, when the arm is at the bottom of its travel, snaps under the front end of a lever 38 pivoted at 39 and is connected at its rear end by a pin and slot connection to a numeric type lever 20. On the up stroke of the arm 35, pawl 37 rocks the lever 38 which operates its associated type bar. Each arm 35 has pivoted thereto a link 40 which is pivoted to a lever 41 which is, in turn, connected to a vertical link 42 for operating a goose neck and sector gear 49 associated with the totalizer. This mechanism is well known and described in detail in the patent to Wahl, 1,270,471.

Associated with each latch and engaging a depending arm thereon is a solenoid 120 which is adapted to be operated normally by the totalizer read out mechanism or the magnetic drums of the present invention as will later be described.

The typewriter carriage has a feed rack 43 engaging a pinion 44 connected with an escapement wheel 45, which is controlled by feed dogs mounted on a dog rocker 46, operated by a link 47 which, at its forward end, is pivoted at 48 to an arm 50 on a rock shaft 51, which shaft has on its ends (hidden) two upright arms, to which are pivoted the extensions 52 of a universal bail 53 mounted in an arc shaped frame in a type bar basket 54. The universal bail 53 is actuated by the heel of a type bar when thrown to the printing position. The dog rocker 46 may also be operated by a space bar 55 whose arms 56 are fast on a rock shaft 57 having an arm 58 articulated at 60 with a lever 61, the upper end of which engages an ear 62 on the link 47.

The carriage is drawn to the left by the usual spring. This motion may be controlled on occasion by a tabulator mechanism. The stop bar 59 at the rear of the typewriter carriage carries column stop 63 adapted to be arrested by denominational stops 64 mounted in a frame 65 at the rear of the typewriter. The stops 64 are operated by vertical levers 66, which, in the present machine, are or may be operated by power under control of the tabulator keys 67 at the front of the machine. The mechanism for operating most of the denominational stops is not shown herein, but the drawing does show the mechanism for operating one of the stops 64 automatically by the travel of the typewriter carriage. This particular stop is operated by one of a plurality of levers 66, which, like the other such levers, is operated by a slide 68 which, in turn, is operated by a vertical lever 70 pivoted in a special tabulator frame 71. This mechanism is substantially the same as that described in the patent to Dodge et al., 2,064,154, December 15, 1936, and it will, therefore, be unnecessary to describe it further. Lever 70 is operated by a link 72 pivoted on the follower lever 73 of a cam 74 which is loose on the drive shaft 26 and operated by a clutch comprising a toothed wheel fast on said shaft and engageable by a dog 75. This dog is normally held out of engagement by a compound latch 76 in the form of a three armed lever pivoted at 77, the horizontal arm of this lever normally holding the cam in the position shown in Fig. 2. When this lever is rocked counterclockwise to release the dog 75, a tooth or hook on the end of the upright arm 78 of this lever moves into the path of the dog 75, and arrests the dog at about the end of a quarter rotation of the cam, so that the cam stands in that position until the compound dog is rocked back to normal position. When that occurs the dog is released from the latch arm 78 and is, at the end of its complete rotation, arrested in normal position by the arm 76. The outline of the cam 74 is such that, during the first quarter rotation thereof, it rocks the follower lever 73 toward the rear, moving the stop 64 into active position and holding it there until near the end of the complete rotation of the cam. More than half of the outline of this cam is a concentric high part, so that the stop 64 is not withdrawn instantly on the release of the dog arm 78, but remains in stopping position until near the end of the rotation of the cam, thus giving the carriage time to settle down from any vibration that may have been caused by its arrest.

The latch or detent 76, is operated by a plate-like elver 80, which lies beneath the rearwardly extending third arm of the latch member. This lever is adapted to be rocked clockwise in order to operate said latch by a long rod 81 resting on its rear end and extending upward to a point above the top plate of the typewriter, where its upper end rests under the end of an arm 82 of a device arranged to rock on a transverse horizontal pivotal axis, and comprising an upstanding arm 83 adapted to cooperate with a cam 79 mounted on the underside of the rack bar 43 in such manner that it can be set at any desired location lengthwise of said bar.

Except as hereinafter described, the computing mechanism is of the sort that has long been used in the Remington machine and which is described in a line of patents, which, in a way, may be said to begin with that to Wahl 1,270,471, dated June 25, 1918. The differential and control mechanism of this computer is mostly mounted on a casting 84 (Fig. 3), which casting is secured to the front of the top plate of the typewriter. Vertical totalizers or "dummies" 85 may be mounted at whatever points desired on a main truck 86, connected with the typewriter carriage 15 by means of certain arms 87 having pin and slot connections with brackets 88 at the ends of the truck. The machine also includes a cross footing mechanism including a cross truck 91 carrying a cross totalizer 90 and picked up by the vertical totalizers 85 one after another through the intermediary of a pick-up beam 92. At the end of each computing column the cross truck is freed from the vertical totalizer and is drawn back by a spring to its initial right hand position.

The links 42 (Fig. 2) operate the usual "fan"

segments and goose neck cams 49, which rock a differential shaft 93 (Fig. 3) and operate the vertical master wheel 94 (Fig. 4) and a cross master wheel 95 to rotate the "carrier" gear wheels 96 and 97 of the vertical and cross totalizers, respectively. Motion of these gear wheels is transmitted by idler gears 98 (Fig. 5) to dials 100. The transfer mechanism, etc., are all of the usual kind. The vertical master wheel is reversible for subtraction by means of the usual hand lever, not shown which lever is used during clearing operations. The cross master wheel is reversible for subtraction by the usual means including a follower roller 101 (Figs. 3 and 4) mounted on an arm 102 fast on a rock shaft 103 and operating the reversing mechanism. The follower roller 101 is under the control of cam plates 104, one on each of the vertical totalizers 85, and each cam is settable to an upper position where it does not depress the roller 101, but leaves the cross master wheel set for addition, as in the first two (OB and CR) of the five totalizers shown in Fig. 3, or to an intermediate position as in the fourth totalizer ST shown, where it disconnects the cross master wheel leaving it inoperative, or to a lowest position shown on the third and fifth totalizers CR and T, where it depresses the roller 101 to the full extent and sets the cross master wheel for subtraction. The totalizers OB, ST, and T are "dummies" in that they do not register but merely control the cross totalizer by their cams. Both the vertical and cross master wheels may be reversed simultaneously, each irrespective of whether set originally for addition or subtraction, by a mechanism described and shown in the above Roggenstein patent. This mechanism is controlled by the correction key 99 (Fig. 1) and may be set manually or by an impulse from the magnetic storage tape or the total read out mechanism, as will be described later.

*Total read out mechanism (Figs. 4, 5, 6)*

The cross totalizer 90 is provided with an extra shaft 105 having journaled thereon a set of thirty-toothed wheels 106, one meshing with each of the carrier wheels 97. Each of the wheels 106 has riveted thereto a spacer 107 and a disc 108. Each disc 108 has three teeth 109 projecting therefrom and capable of being sensed so as to read the indication of the wheel. The totalizer has one carrier wheel at its extreme left hand side not connected with a dial, but provided with a special disc 110 having fifteen teeth 113, cooperating with sensing finger 127 (Fig. 5) for indicating a positive or negative balance.

The sensing unit for reading the cross totalizer comprises a framework carrying a piece of insulating material 111 (Fig. 4) in the shape of an arch or segment of a cylinder, whose end is secured to plate 112 by screws. The right hand end of this segment is supported by a frame member 114 (Figs. 5 and 6) secured to rods 115.

The means for sensing the digital positions of the totalizer wheel consists essentially of a series of ten sensing fingers 117 adapted to make electrical contact with the teeth 109. These fingers have their ends projecting into the paths of movement of the teeth 109 as the latter travel with the carriage. They are arranged in an arc about the shaft 105 and are spaced 12° apart in said arc, the same as the teeth of the wheels 106, and are so situated that when in the leftward travel of the carriage a particular carrier wheel 97 is in mesh with the master wheel 95, one of the teeth 109 of its meshing wheel 106 is in contact with a finger 117, as shown in dotted lines in Fig. 7.

Each finger 117 is pivoted to a support 118 which is itself pivoted to a fixed but adjustable plate 119, secured to a post 116 which passes through and is supported by the arched insulator 111. A spring is compressed between the plate 119 and a branch of the finger 117 tending to rock said finger clockwise about its pivot, such rocking being limited by a pin on the support 118. The construction is such that the finger has a fixed rest position relative to the support and is free to swing leftward but not rightward. The right hand edge of the tooth 109 and the left hand edge of the finger 117 are leveled so that, when the tooth is travelling with the carriage toward the right, it cams the finger out of its path. As the finger 117 cannot swing rightward about its own pivot, the support 118 swings clockwise, so that the finger is swung out of the path of the tooth and snaps in behind it after a relatively short travel of the carriage, as will be apparent from Fig. 7. On the other hand, as the carriage steps leftward the construction is such that the tooth is in contact with the finger through a materially greater extent of the travel of the former, before it moves out of its path and snaps back. A tooth 109 is shown by solid lines one step to the right of its active position. It will be seen that the tooth, when being carried leftward to its active position (shown in dotted lines), makes contact a little before reaching the rest position and does not lose contact until after moving a considerable part of the next succeeding step, also shown in dotted lines. This is important, as the escapement and the tabulator stops which arrest the carriage are at the rear of the machine on the carriage and the totalizer is at the front, and when the carriage is arrested there is a certain amount of overthrow of the totalizer, which vibrates back and forth for a moment and to some extent, which, except for the above construction, might cause the tooth to lose contact with the sensing finger.

The post 116 passes through a threaded sleeve 121 (Fig. 7) having a washer 122 and a nut 123, a conductor wire being soldered to the washer. Each plate 119 has a sheet of insulation secured to one face thereof to avoid contact with adjacent plates. It will be seen that all of the fingers 117 are insulated from the frame of the machine and from one another, so that a circuit may be established from a tooth 109 to actuate a print solenoid 120 which rocks the latch 33 (Fig. 2) to actuate a numeric print bar 17 which prints the number and enters the amount in the vertical totalizer, as described above.

The normal position of a finger 117 (Fig. 7) is just to the right of the rest position of a tooth 109, so that said fingers do not interfere with the rotation of the totalizer wheel. When the amount is entered as above, it is subtracted from the totalizer, causing the register wheel to be turned to zero. This rotation moves the tooth out of contact with the finger which immediately snaps to its normal position, where it is out of the way.

Figure 3:
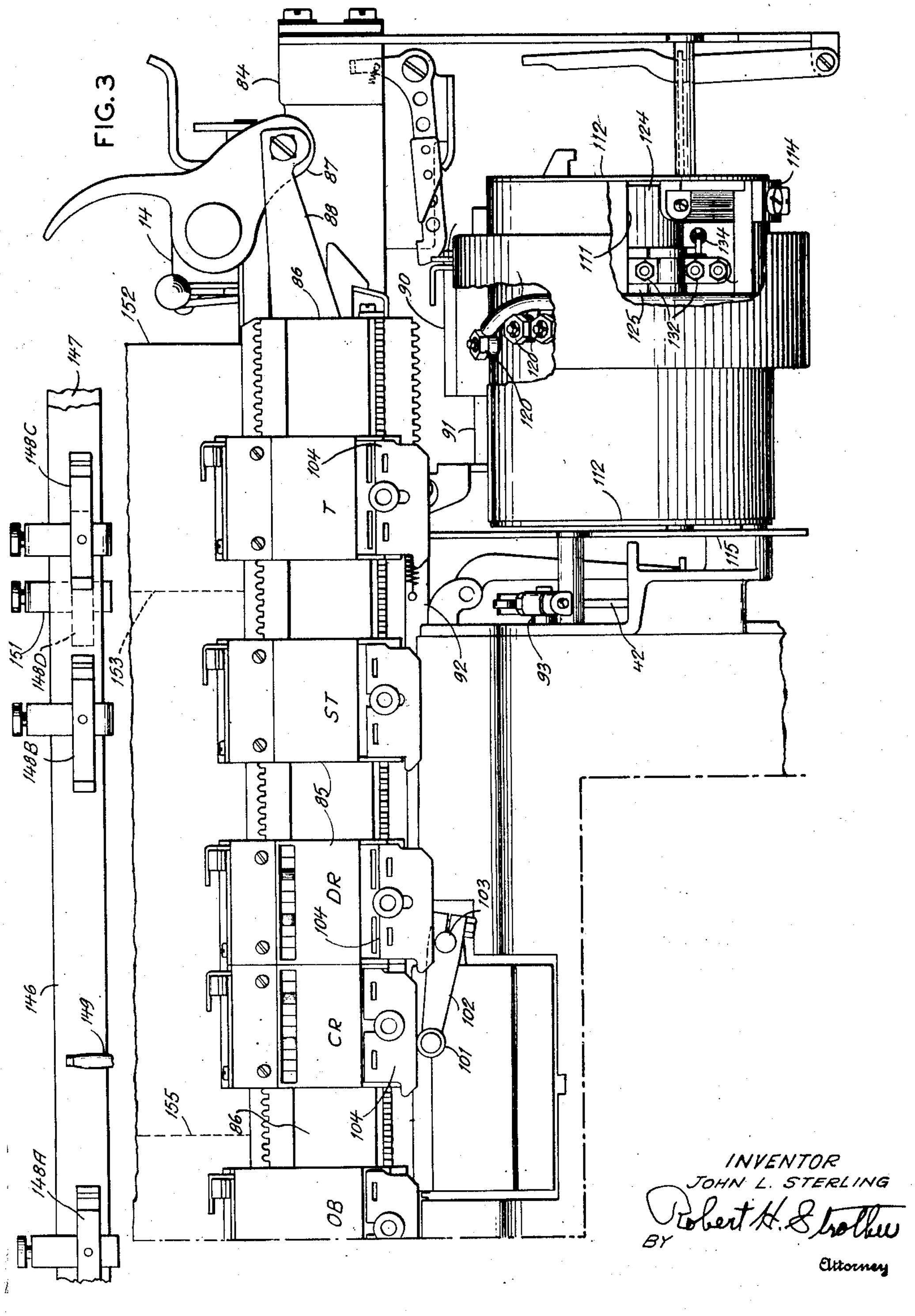
Fig. 3 is an enlarged partial front view of the totalizers of the bookkeeping machine.
Figure 4:
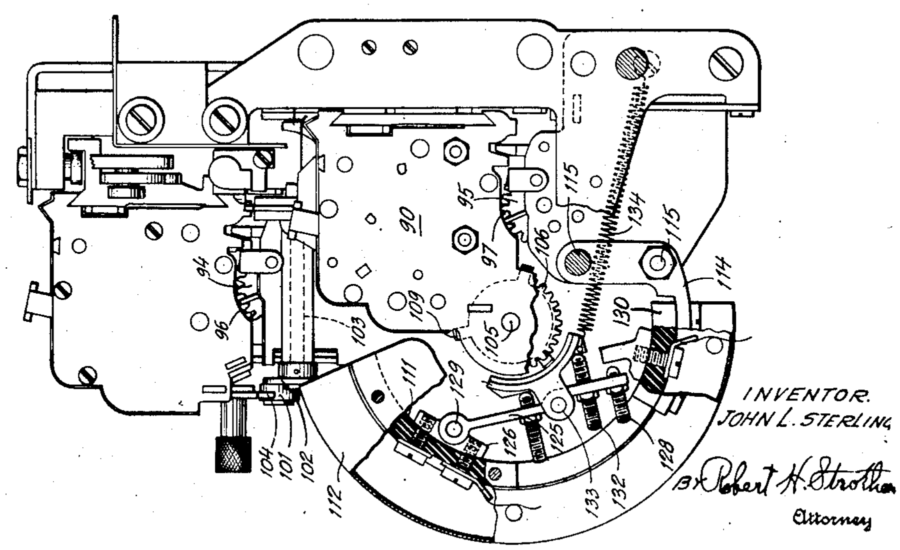
Fig. 4 is a detail side view of the vertical and cross totalizers and some of the sensing mechanism for total read out.
Figure 7:
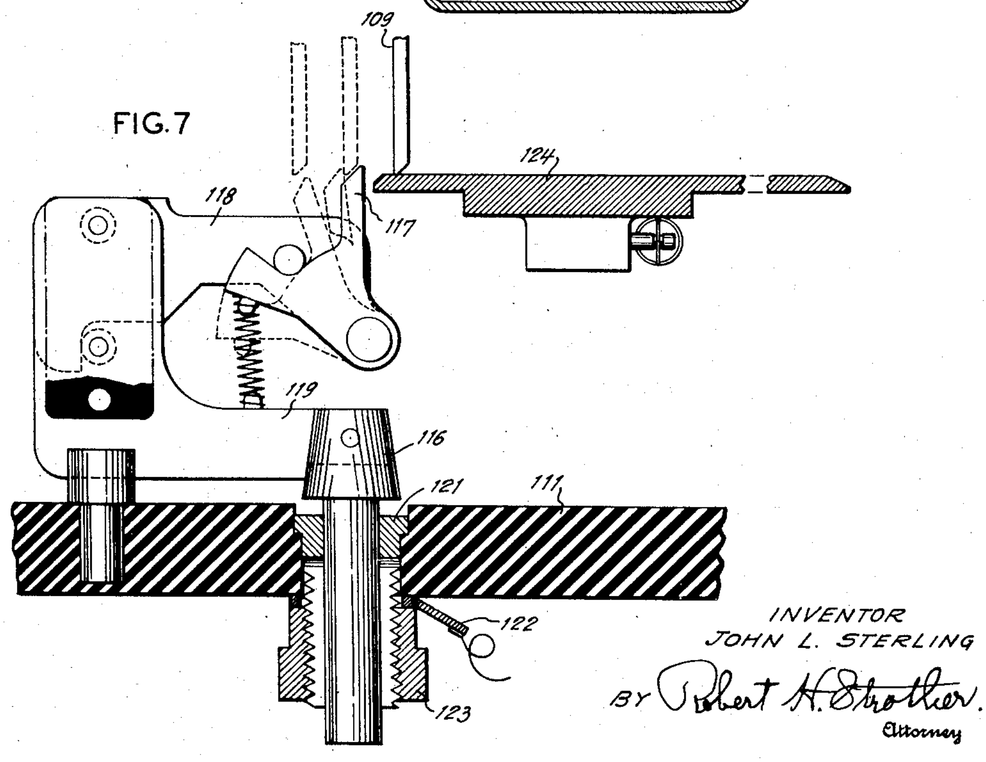
Fig. 7 is an enlarged section showing the action of the sensing teeth with the cross totalizer wheels.
Figure 9:
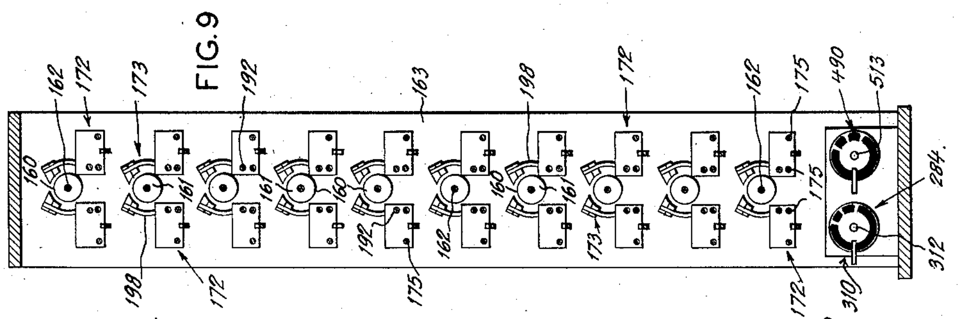
Fig. 9 is a cross section taken along line 9—9 of Fig. 8.

In order to detect the arrival of the master wheel at a totalizer wheel which at the time registers a digit other than zero (significant digit), the following mechanism is provided (Figs. 3, 4, and 7). Just at the right of the row of sensing fingers 117 there is mounted a metallic arch shaped detector 124. This detector is mounted on an arm or lever 125 which is pivoted at 129 to a block 126 secured to the insulating arch 111, so that the detector can swing about its pivot toward and from the wheels 106. A wire is secured to the screw holding block 126 to provide a conducting circuit to detector 124. The inward motion of the detector is limited by an adjustable contact screw 128 at the lower end of the lever 125, said screw being adapted to strike a block or finger 130 of metal, which is secured to the insulator 111 by a screw to which is fastened a conductor wire. In order to secure the proper adjustment of the detector 124, screws 132 are provided to enable the detector to be adjusted about the pivot 133 and held firmly in adjusted position. In use, the whole swinging member is one rigid structure pivoted at 129.

The right hand edge of the detector is beveled so that the teeth 109 may cam the detector outward during the travel of the carriage toward the left. The bevel on the teeth themselves will cam it outward during the rightward travel of the totalizer. The detector is driven toward the totalizer wheels by a spring 134.

The arc covered by the detector is of an extent equal to nine tooth spaces of the wheel 106 and it is so positioned that, if a wheel stands at zero, one of its teeth 109 will be just above the upper edge and another of its teeth just below the lower edge of the detector, so that a wheel standing in this position will not hold the detector in its outer position. If, however, any wheel registers a digit other than zero, one of its teeth 109 engages the detector and holds it a short distance away from the wheel, as shown in Fig. 4. The contact screw 128 is so adjusted that, when there is no wheel behind the detector registering a digit other than zero, the detector will swing inward until the screw 128 touches and is arrested by the block 130, and will thereby make electrical contact; but a wheel in any other position will hold the detector outward and prevent the screw 128 from making contact. The left hand edge of this detector (Fig. 7) is at such a distance to the right of the sensing fingers 117 that, when a totalizer wheel is in engagement with the master wheel and its tooth 109 is in contact with one of the fingers 117, the next wheel to the right of it will still be behind the detector. When the last wheel that registers a digit other than zero moves into engagement with the master wheel, the detector will be freed and by means of spring 134 contact will be made between screw 128 and block 130. The detector 124 is at least long enough toward the right so that, when the highest totalizer wheel is in engagement with the master wheel, the lowest wheel will be behind the detector.

Figure 5:
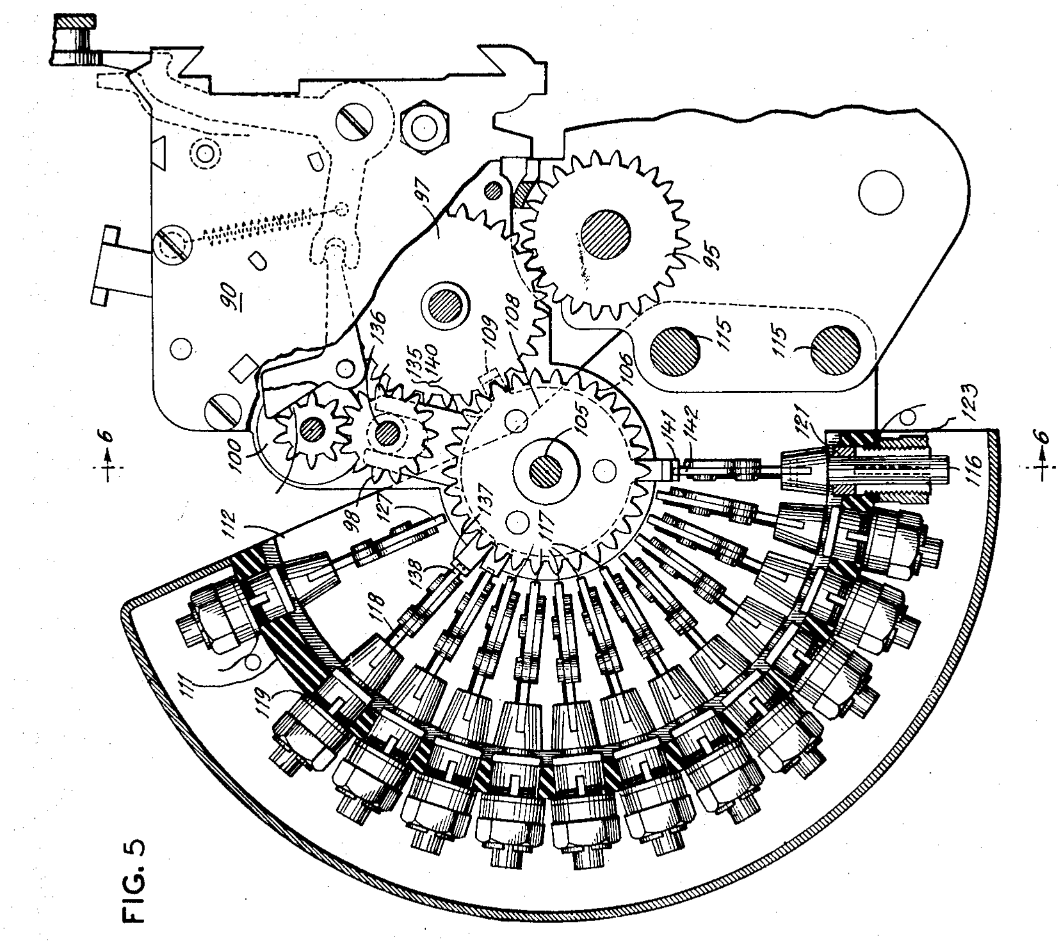
Fig. 5 is an enlarged view of the total read out mechanism.
Figure 6:
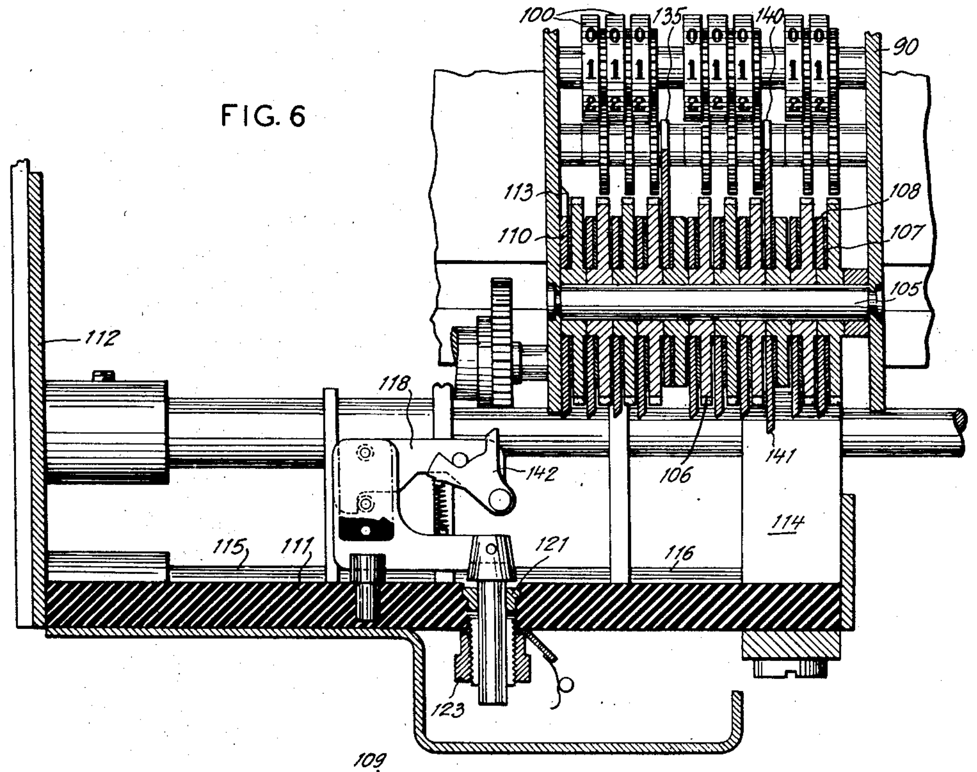
Fig. 6 is a partial cross section taken along line 6—6 of Fig. 5 showing some of the mechanism in the cross totalizer.

Remington totalizers are sometimes spaced for punctuation by commas, one such space being shown in Fig. 6. When this position of the totalizer reaches the master wheel, the carriage is automatically letter-spaced under the control of a stationary disc 135 having an arm or branch extending upward and forked to embrace the shaft 136 on which the idler pinions 98 are journaled, to prevent rotation of the disc. This disc has a tooth 137 (Fig. 5) one tooth space above the zero position of a wheel 106. This tooth 137 is longer than the teeth 109 and it cooperates with a sensing finger 138 similar to the sensing fingers 117, but shorter so that it will not be actuated by one of the teeth 109. This sensing finger 138 is mounted in a manner similar to that described above.

The totalizer also has a blank space for the decimal point and this is occupied by a disc 140, whose outline is similar to disc 135, except that its tooth 141 occupies a position one tooth-space behind the nine position of the wheel. This tooth, like the tooth 137, is longer than the teeth 109 and it is engaged by a fore-shortened sensing finger 142 (Figs. 5 and 6). The teeth 109 and finger 142 not only cause a letter-space step of the carriage, but also perform another function, which will be described.

The automatic spacing of the carriage is effected by a solenoid 143 (Fig. 2) mounted on a bracket 144 secured to the frame or casing 65 for the tabulator stops. This solenoid has its plunger 145 in position to push forward an arm secured to the rear surface of the dog-rocker 46. The momentary reciprocation of this plunger will operate the dog-rocker the same as the ordinary link 47.

In order to control the electric circuit for reading out and printing totals by the typewriter carriage, the following devices are provided (Figs. 2 and 3). The bracket 144 projects some distance rearward and includes a leftward projecting branch to which is secured a group of contact springs separated by insulating material in the usual way, and comprising three sets of contacts which are controlled by cam blocks on cam bars 146 and 147. The cam blocks 148 may be secured to the bar in any suitable way. In the particular embodiment shown there are four cam blocks used, but it is obvious that any number or shape of cam block may be used to attain the desired result. In Fig. 3 it will be noted that there are three cam blocks 148A, 148B, and 148C mounted on bar 146 and block 148D, is mounted on bar 147 by means of adjustable arm 151. The blocks are on the forward face of the bars 146 and 147 and their left hand ends are inclined so as, in the leftward travel of the carriage, to cam forward a roller 149, mounted on the upper end of an actuating arm associated with each group of contact springs secured to the bracket 144. As the carriage travels toward the left, a block 148 will cam the roller 149 toward the front of the machine [to the right (Figs. 22 and 23)], thus closing the contacts.

Block 148A (Fig. 3) is so positioned that it will close the associated contacts when the carriage is positioned to read an old balance out of the storage device, hereinafter described, and enter the amount in the first vertical totalizer OB from the left, and from it into the cross totalizer 90. The high part of this cam block is such that the contacts are kept closed during the travel of the carriage past the position occupied by the vertical totalizer OB. These contacts make the total writing mechanism effective even though the cross totalizer is not in the normal writing position, thus completing the necessary circuits, as will be described later.

Block 148B is the normal total writing cam and is positioned on the carriage with respect to that step of the carriage in which the highest significant wheel of the cross totalizer is brought into engagement with the cross master wheel 95, so that the circuit for the automatic writing of a total is closed at that instant. The high part of this cam 148B is of such length as to keep the contacts closed during the entire travel of the wheels 97 over the master wheel. After writing the last digit of a total the carriage steps to the sub-units position. In this position certain contacts open and others remain closed in order that the clear signal may be printed.

In order to make clear the operation of the invention a characteristic set-up of the machine is illustrated, more or less diagrammatically, in Fig. 3. In this set-up the left hand vertical totalizer OB has its control cam set in its uppermost position, so as to cause numbers to be read out of the magnetic storage and written in the columns defined by said totalizer and to be added in the cross totalizer. A second vertical totalizer CR has its cam 104 set to cause addition in the cross totalizer. After an interval a third vertical totalizer DR is set to cause substraction in the cross totalizer. In the total position is placed a fourth totalizer ST which is a dummy. If this was all that was required, that is to say, a column of numbers to be added, a column of numbers to be subtracted, and a column for totals, this totalizer or dummy would have its cam 104 set for subtraction. In the present instance, however, this column is used for sub-totals or running totals and the cam is, therefore, set in its mid position which disconnects the master wheel of the cross totalizer. A fifth totalizer T, which is also a dummy, defines a column in which the cross totalizer is cleared and the cam 104 of this totalizer is, therefore, set for subtraction. At the position of the fourth or running total column, there is positioned on the bar 146 a cam block 148B, and on the bar 147 a cam block 148D, and at the fifth or total-with-clearing position, there is a cam block 148C. These are shown in Fig. 3 by a sort of mirage effect at the top of the figure. As a matter of fact they would be hidden behind the other parts. A statement 152 is shown in Fig. 30 which would be made out with the setting of the totalizers shown in Fig. 3 and set as described above. There are five columns of figures each column being controlled by a vertical totalizer. When OB is in registering position the old balance is read out of the magnetic drum, entered in the cross totalizer and printed as shown. When the CR totalizer is in position the amounts entered by the keyboard are credits or deposits and are added in the vertical and cross totalizers. With the DR totalizer position the amounts which are debits are added in vertical and subtracted from the cross totalizers. When the carriage is tabulated to the position of the totalizer ST the total cam 148B causes the total readout mechanism to read out the total standing in the cross totalizer without clearing as the cam 104 is set for disconnect or neutral operation. This printing falls in the balance column. When all of the transactions have been entered the carriage is tabulated to the position of totalizer T which causes the amount in the cross totalizer to be subtracted as it is read out into the magnetic storage and printed by the action of the print magnets 120.

In this set-up of the machine, the space between the DR and ST totalizers would be bridged on the tabulator column stop bar by an automatic tabulator cam block of the sort above described, and of such length and so disposed that after the operator has written the last digit of the item in the third column, the carriage immediately jumps to the highest visible denomination of the fourth vertical totalizer ST.

*Balance storage mechanism*

Figure 8:
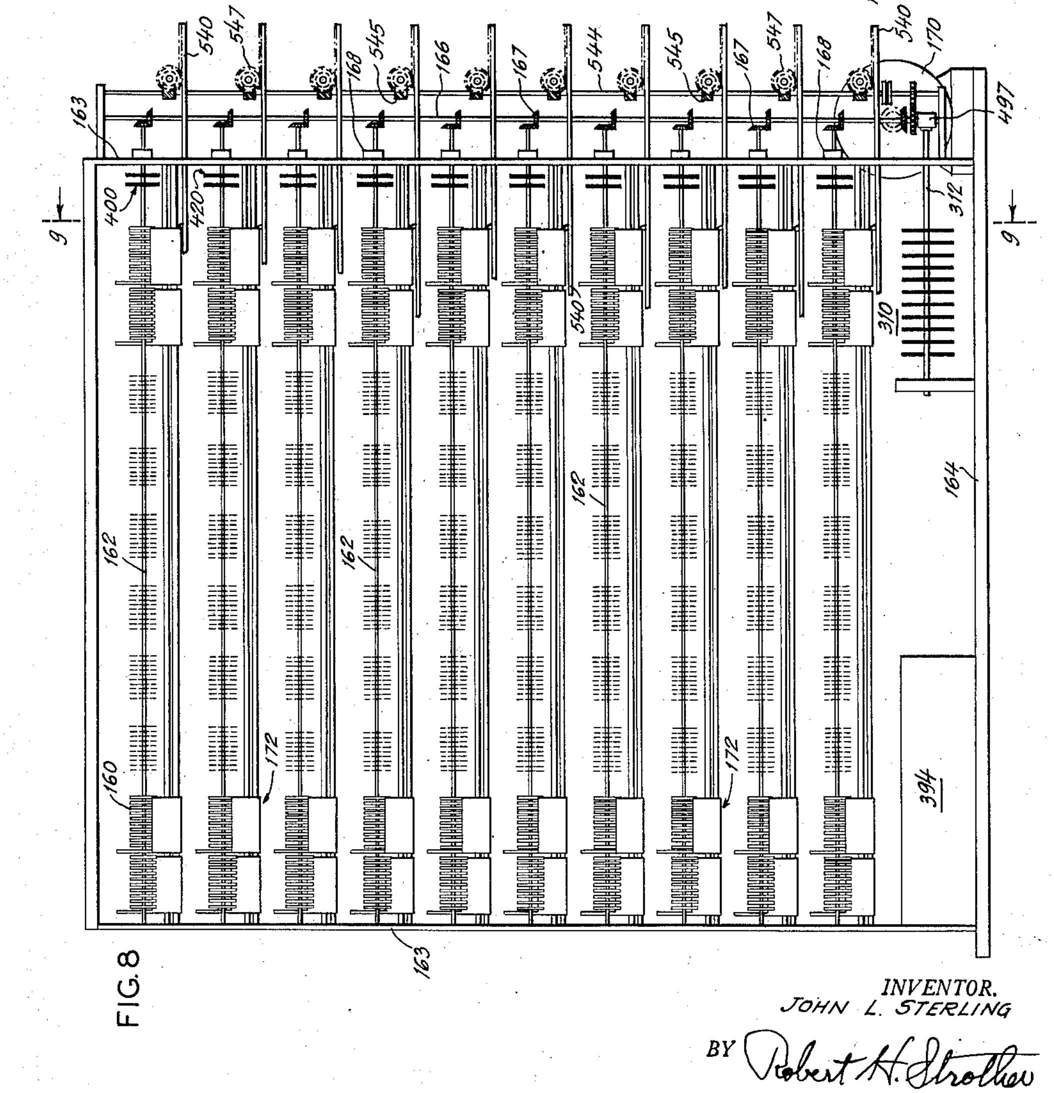
Fig. 8 is a front elevation of the balance storage mechanism.

The most important mechanical features of the bookkeeper having been described, the balance storage mechanism will now be taken up It is well known in the patent to Poulsen referred to above, that magnetic impulses may be impressed on a steel wire or tape, where they will remain until erased by alternating current or direct current of a different polarity from that used in impressing the signals. Using this theory a series of discs 161 of non-magnetic material, such as brass or aluminum (Figs. 8 and 10), are provided, around the circumference of which is bonded a continuous strip 160 of magnetizable material, such as dielectric tape coated with powdered iron oxide. Each disc is of a circumference sufficient to carry a length of tape allowing space for entering ten or less impulses representative of each digit in a balance and a debit signal. A six digit balance, which is the basis of the system in the disclosed invention, would then have fifty-nine degrees of the periphery of the disc allotted to the ten impulses necessary to represent a digit, and six degrees allotted to the debit signal impulse. The magnetization is longitudinal, i. e., tangential to the periphery of the disc, and the magnetic recording reading and erasing heads are disposed accordingly with their respective gaps parallel to the axis of the discs, as shown in Fig. 12. The discs are secured to a shaft 162 (Figs. 8, 10, and 11) in groups of ten, ten groups to a shaft, each shaft being journaled for rotation in side frames 163 which are mounted on a base plate 164 and secured together at the top by a cross plate 165. There are ten shafts, each bearing ten groups, thus providing one thousand accounts or balances per frame. It is obvious that any desired number of frames may be grouped together to provide storage space for a plurality of accounts.

Each of the shafts 162 is driven by a continuously rotating vertical shaft 166 through miter gears 167 under control of a suitable one revolution magnetically operated clutch 168. The vertical shaft 166 is driven by a motor 170 connected to the shaft by a bevel drive 171.

Each group of ten discs has a selecting carriage 172 associated therewith. For purposes of space, alternate carriages are mounted on opposite sides of the discs 161. Each carriage 172 carries a magnetic head 173 comprising a recording and reading coil, and an erasing coil, formed of a box like frame 174 open top and bottom, which is slidably mounted on two cross rods 175 secured in the disc frames 163. Each carriage is adapted to be moved to the right (Fig. 10) by a steel tape 176 fastened to the carriage and wound on a spring drum 177 secured to the escapment rack 183. The pawl 178 (Fig. 11) and pawl 180 are secured to shafts 181 and 182, respectively, journaled in the frame 174 and cooperate with a rack 183, the pitch of which is equal to the pitch of the discs 161. The pawl 178 has an ear 184 formed thereon, which cooperates with a pin 185 in the plunger 186 of a solenoid 187 also mounted on the frame 174. Secured to shaft 181 is an arm 188 carrying a pin 190 engaging with a fork in the pawl 180. When the solenoid 187 is actuated the plunger 186 is pushed out, and through the pin 185 raises the pawl 178, which, through arm 188 and pin 190, permits pawl 180 to drop. The spring drum 177 draws the carriage to the right until pawl 180 engages a tooth, which is equivalent to a half tooth space travel. The release of the solenoid 187 permits a spring 191 to lower pawl 178 and raise pawl 180. The spring drum again moves the carriage to the right until pawl 178 again engages the rack, thus moving another half tooth space.

In all, the carriage has traveled a full tooth space or the distance between two discs. From the foregoing it will be seen that the carriage may be stepped from one disc or account to another until the desired one of ten is selected. Extending through the carriages 172 of each "hundreds" row of discs is a splined shaft 192, on which is mounted the magnetic head 173 individual to each group of ten discs.

The two magnets in the head 173 are coils 193 (Fig. 13), for reading and recording, which are wound on one core 195, and the erasing coil 194 similar to 193, is wound on a separate core similar to core 195. The cores are provided with a grooved portion 196 which surrounds the tape 161, to prevent side flux from adjacent discs, while the head is in operative position. Similar coils are disclosed and described in the patent to M. Camras 2,431,541. These coils are secured to an arm 198, mounted on splined shaft 192.

*Perforation sensing device*

From the above, it is obvious that any means which will control the operation of a solenoid 187 will cause the carriage 172 carrying the head 173 to step until a specific account is selected. A multi bank keyboard could well be used, but the preferred form, as disclosed in Figs. 15, 16 and 17 is a perforation sensing device similar to those used in tabulating machines of the type shown and described in the patent to K. J. Braun 2,211,094, August 13, 1940.

This device could be built into the bookkeeping machine, but for the purpose of illustration it is shown in Fig. 1 as being a separate unit 13 set along side the bookkeeper. The mechanism comprises a reciprocating pin box, the pins of which are adapted to sense the perforations 201 in the upper left hand corner of the ledger sheet 154 in Fig. 30. There are three columns of ten perforation positions, each position representing a digit from zero to nine, the zero being at the top. The account number represented in the ledger 154 is three hundred and forty five.

The sensing device (Figs. 16, 17, and 18) comprises two upper and lower side frames 202 and 203 secured together by tie rods such as 204 and 205. Secured to the upper portion of the frames 202 is a pair of pins 206 on which are slidably mounted a frame 207 carrying a pin box comprising a pair of perforated plates 208 secured to a box like structure formed of plates 211 and 212. Positioned in the plates 208 are three columns of ten sensing pins 210 which are spring urged downward by springs 213. Each pin 210 has an extrusion 214 thereon which coacts with cam windows in a sliding locking plate 215 common to each column. The locking slide 215 is urged to the left (Fig. 16) by a spring 216. Secured between plates 202 just below the sensing pin box is a sensing chamber comprising two perforated plates 217 in the upper of which the lower ends of the sensing pins 210 are guided. The plates 217 are spaced a sufficient distance apart to admit the ledger 154. Secured to a bracket 218 by straps 221 is a solenoid 220, the plunger 222 of which is fastened by a link 223 to a bail member 224 the forward ends of which are pivoted on a shaft 225. A pin 226 (Fig. 17) mounted on the outer side of each of the plates 212 is connected by a link 227 to the bail member 224. A bracket 228 secured to each of the frame members 212 carries a shaft 230 on which is freely mounted a bail member 231 the bridge of which rests against the locking slides 215. On one arm of the bail 231 is a roller 232 which cooperates with a cam plate 233 secured to a cross member 234. A microswitch 235 (Fig. 16) secured to the upper of the plates 217 has the trigger portion extending down into the path of the ledger sheet, so as to be closed upon introduction of the ledger. Closure of the switch 235 energizes the solenoid 220 which rocks bail 224 about shaft 225 and through links 227 and pins 226 draws frame 207 downward. The downward travel of frame 207 carries those pins which find perforations, through the ledger, while those not finding perforations are held up.

The pin box in Fig. 16 is shown in its full down position. In the normal or up position the roller 232 is riding on the vertical portion of cam 233, thus holding the slides 215 to the right. As the pin box descends the slides 215 move to the left as the roller follows the cam 233. Thus the extrusions 214 on any pins 210 which have passed through a card are locked by the noses on the windows of the locking plate and are carried on down in a positive manner to actuate set pins 236. The set pins 236 are mounted in a stationary box 237 similar to the sensing pin box, and they also have extrusions 238 thereon which cooperate with locking slides 240 which are urged toward the left by leaf springs 241. Associated with the locking slides 240 is a bail member 242 mounted for reciprocation on a shaft 243. The bridge of the bail 242 cooperates with the ends of the locking slides 240 in such manner that when the bail is rocked the slides are moved to the right. The bail is actuated by a solenoid 244, mounted by straps 245 on a bracket 246 secured to the right hand frame 203. The plunger 247 of the solenoid is connected to the bail by a link 248. The solenoid is actuated in a simple circuit through brushes 249 and 250 (Figs. 17 and 29) secured to the frame 207 and a commutator 251 secured to the frame 202. As the sensing pin box descends, the brush 250 closes a circuit at a predetermined time in the travel actuating the solenoid 244 which forces its plunger out and rocks the bail 242 clockwise (Fig. 16) to move the locking slide 240 to the right, thus releasing all set pins 236 previously operated. This operation occurs during the first portion of the descent of the pin box and is held until all new set pins have been depressed. Just prior to the end of the downward travel of the sensing pin box the circuit is opened, as will be described later, and the slide is released, permitting the locking slide to lock all pins that have been depressed by the sensing pins in their down position.

As the pin box reaches the limit of its downward travel, an arm 252 (Figs. 15 and 28) secured to the frame 207 opens a pair of contacts 253 secured to the frame 202, which are in the operating circuit of solenoid 220, releasing the solenoid and permitting the pin box to rise under influence of spring 256. These contacts are so constructed that when depressed by the arm 252 one of the springs of the pair is latched down by by a latch member 254 controlled by a solenoid 255. The latch holds the contacts open until the solenoid 255 is actuated by movement of the bookkeeping carriage.

Associated with each set pin 236 (Fig. 16) is a pin 265 guided in a pair of perforated plates 266 secured in a frame 267. Secured to frame 267 is a third and lower plate 268 in which is secured a Bowden wire 270 in alignment with each pin 265. The other ends of the Bowden wires are secured in a plate 271 secured to a frame 272 having guide plates 273 for pins 274. The pins 274 are provided with tips of hard rubber or other suitable insulating material which cooperate with multicontact switches 275. Any pin 236 which has been selected and locked down will through pin 265, Bowden wire 273 and pin 274, close its associated contact 275.

In order that the above described mechanism become effective, the operator must place the bookkeeping carriage in the position in which the old balance is to be written, i. e., the right most position, before introducing the corner of the ledger sheet into the sensing mechanism. In this position the cam 148A will close the switch 280 (see Figs. 8, 22, and 23) which will provide current for operating the sensing mechanism, over a circuit now to be traced. Current from the ordinary A. C. mains is connected by leads 281 and 282 across the primary of a transformer 283. In lead 281 is a main switch 284 for controlling a motor 285 connected across the leads 281 and 282. One leg of the secondary winding of transformer 283 is connected by a lead 286 through a switch 287 to a terminal of a connector block 288 over leads 290 and 291 through the left hand contact of switch 280 over leads 292 and 293 through the connector block over lead 294 to an A. C. plate of a rectifier 295. The other leg of the secondary winding of transformer 283 is connected by lead 296 direct to the other A. C. plate of the rectifier. Thus it will be seen that the closure of switch 280 by the carriage makes the rectifier effective, thus providing D. C. current for the operation of the sensing unit.

In view of the fact that the sensing unit is a separate device from the bookkeeper and storage unit, and the circuits are all short, they have been shown by themselves in Fig. 29. The circuits for operating the sensing unit are traced as follows: The insertion of the corner of the ledger sheet 154, containing the perforations 201, will close the microswitch 235 which completes a circuit from the negative leg of the rectifier over lead 300 through contacts 253 over lead 301 through microswitch 235, thence through the winding of solenoid 220 over leads 302 and 303 to the positive leg of the rectifier. This circuit operates the solenoid 220 which lowers the pin box 208, thus sensing the perforations 201. As the pin box starts down the brush 250 closes the following circuits: From negative lead 300 through the contacts 253 lead 301 through brush 249, commutator 251, brush 250, lead 304 through the winding of solenoid 244 over conductor 303 to positive. This circuit operates the solenoid 244 which rocks the bail 242 to release all pins 236 which have been locked down. At the extreme end of the downward stroke of the pin box 208 the arm 252 opens the contacts 253, thus releasing the solenoid 220, and brush 250 having passed over the active part of commutator 251 releases the solenoid 244. When the contacts 253 were opened they were latched down by latch 254 which is controlled by the solenoid 255. The opening of contacts 253 beside releasing solenoid 220 opened the circuit from negative to brush 249, thus making the commutator 251 ineffective on the up stroke of the pin box. This insures that the solenoid 244 will not be re-operated. The solenoid 255 is under control of the escapement ratchet 45 for the bookkeeping carriage. Operation of any key in the bookkeeper will cause the carriage to step, thus causing wheel 45 to rotate, thus closing contacts 305 which complete the following circuit from negative lead 300 over lead 306 through the winding of solenoid 255, lead 307 through contacts 305 over lead 303 to positive lead 303. This circuit operates solenoid 255 unlatching contacts 253 preparing them for another operation.

There are three columns of ten switches 275 and, as viewed in Fig. 17, the left hand column of switches controls the "hundreds" selection of discs 161, the middle column controls the "tens" selection, and the right column controls the "units" selection.

As an example, let it be assumed that account number three hundred and forty-five is to be selected. This number is perforated in the upper left hand corner of the ledger sheet 154 which perforations select the desired switches 275, as described above. Referring now to Figs. 18 to 23, inclusive, which, when combined in accordance with Fig. 24, constitute a wiring diagram of the invention, and particularly to Figs. 18, 19, and 20 it will be seen that the "three" switch in the "hundreds" or left hand column of switches 275 connects ground to the "three hundreds" (fourth horizontal group) solenoids 187. The "four" switch 275 in the "tens" or middle column of switches 275 will connect all "four" solenoids 187 to the common brushes of the pulsing device 310, and the "five" switch 275 in the "units" column (right hand) will complete a circuit to the "five" commutator of the pulsing device.

The pulsing device 310 comprises ten commutators secured on a sleeve 311 mounted on a square shaft 312. An example of some of the commutators is shown in Figs. 20, 25. The commutators are formed, as shown of a disc 313 of suitable insulating material such as Micarta and a pair of copper discs 314 and 315 secured one on each side of the disc 313, by rivets which electrically connect the copper discs. The discs 314 are full circles, while discs 315 are segmented to provide one or more contacts up to ten. Associated with each disc 314 is a brush 316 and with each disc 315 is a brush 317. The shaft 312 is rotated under control of a one revolution magnetically operated clutch 318 driven by vertical shaft 166. For convenience of identification the commutators have been numbered from 320 to 329, inclusive.

The circuit for selecting a specific solenoid 187 (Figs. 18, 19, 20, 22) will now be described in detail. From ground over lead 330, through the left hand contacts of the "three hundreds" switch 275, lead 331, through the winding of the "four" solenoid 187 in the "three hundreds" group, leads 332 and 333, right hand contacts of the "four" switch 275 in the "tens" column, leads 334 and 335 through the common brush 316, "five" commutator 325 brush 317, over lead 336, right hand contacts of the "five" switch 275 in the "units" column, thence over leads 337, 340, 338, and 300 to the negative leg of rectifier 295. A further circuit is closed by the switches 275 from negative on lead 300 over leads 338, 340, 337, through the winding of the clutch magnet 318 over lead 341, through the left hand contacts of "five" switch 275 in the "tens" column over lead 342 to ground. These two circuits cause the pulsing commutators to be rotated and the "five" commutator actuates the "four" solenoid 187 in the account selecting carriage 172 six times, thus positioning the carriage opposite the account three hundred and forty five.

To review, up to this point the operator has selected the desired account by inserting the left hand corner of the ledger sheet in the sensing mechanism. The operator now withdraws the ledger sheet 154 from the sensing mechanism and positions it with a statement 152 around the platen of the bookkeeping machine the carriage of which is in the old balance writing position, i. e., to the extreme right. In this position, as described above, the vertical totalizer OB is in the entering position and the cam block 148A has closed the switch 280 completing the circuit for the rectifier. The closure of this switch also completes circuits for preparing the bookkeeper for automatic printing by connecting negative current to the symbol and digit writing solenoids. This circuit (Figs. 22, 23) is traced from ground in the lower right hand corner of Fig. 22 over lead 343 through the winding of the relay RI leads 344 and 345 through the contacts 346, leads 347 and 300 to the negative leg of the rectifier. It will be noted that, since the terminal block 288 is merely provided for convenience in the wiring of the machine, all leads hereafter, going through will be given the same reference character. The above circuit operates the relay RI which closes a circuit through its make contact from negative over leads 300 and 347, contact 346, lead 345, make contact of relay RI, lead 348, through the winding of relay RIII, lead 350, through the break contact of relay RIII, lead 351, lower break contact of relay RIV, lead 352, through the contacts 358, over lead 353, through the right hand contacts of switch 280, over leads 354, and 355, through the winding of the relay RVII, lead 455 to the one to nine, inclusive, print solenoids. A branch circuit also goes to the zero print solenoid over lead 356 and another branch circuit from lead 352 goes to the symbol print solenoids over lead 357. The three circuits above all provide negative current for the print solenoids. This prepares the bookkeeper to receive the impulses from the magnetic storage tapes 160.

The operator now sets the reading recording and erasing key 360 (Fig. 21) in the reading position as shown and actuates the starting key 361. When the "three" switch 275 was set by the sensing mechanism it prepared a circuit which is completed by the operation of the start key 361. This circuit is traced as follows: From ground (Fig. 18) over leads 342 and 362 through the right hand contact of the "three hundreds" switch 275, lead 363, through the winding of the magnetically operated clutch 168, for the drive of the magnetic discs 161, over lead 364, through the winding of the head control relay RHC over lead 365, through start key 361, now operated, leads 366 and 300 to negative. This circuit operates the one revolution clutch 168 in the three hundreds group starting the rotation of the shaft carrying the disc containing the account three hundred and forty-five. The same circuit also operates the relay RHC which locks up over a circuit from ground already traced over lead 364 through the winding of the relay, lead 367, lower make contact of the relay, leads 368, 338 and 300 to negative. The above described locking circuit remains closed during the reading of an old balance from the tape 160. Relay RHC also closes a circuit from ground through the winding of the solenoid 375 which rocks the splined shaft 192 carrying the magnetic heads 173 through the medium of a bell crank 376 connected by a link 377 to a lever 378 secured to each of the shafts 192. Thus it will be seen that the operation of the start key has started the discs 161 rotating and rocked the magnetic head into effective position to read the amount in the selected tape 160.

Figure 23:
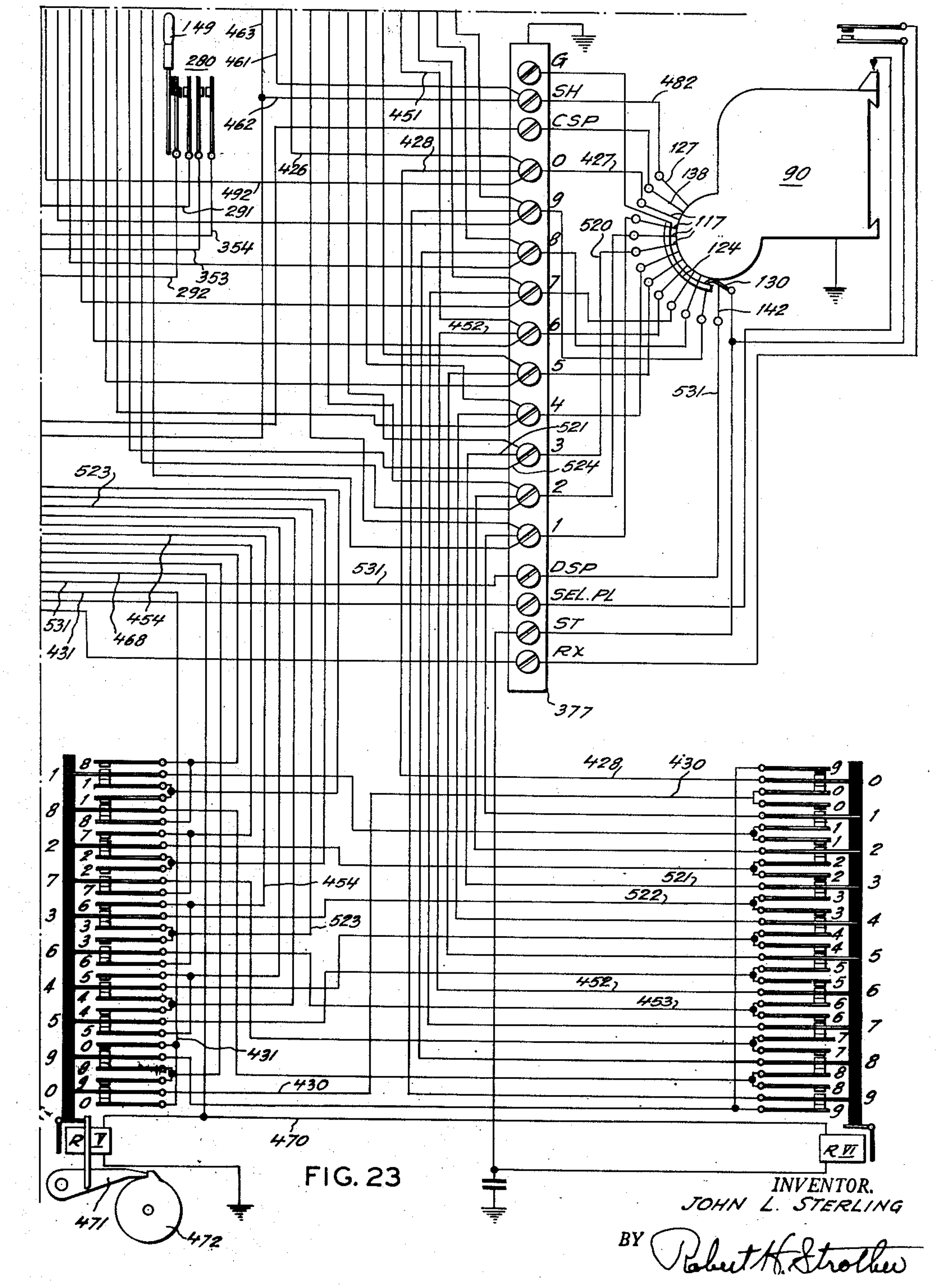

Referring to Fig. 23, it will be noted that a terminal block 377 is provided, to which are connected all the wires from the total read out mechanism and the reading and recording circuits from the magnetic tapes 160. These wires in turn all lead to the contacts of a relay RVI, viz., to the respective middle spring blades of ten sets of break make contacts. It will also be noted that the terminals on the terminal board 377 are numbered to correspond to the value being introduced over the respective circuits. It is the function of the relay RVI to set up the circuits for the printing of the tens-complement of a digit in a negative total indicated in either the register 90 or the tapes 160. From alternate contacts of the relay RVI conductors lead to the middle spring blades of the contacts of the relay RV. From the contacts of this relay conductors lead to the coils of the respective print solenoids 120. These solenoids will be referred to as the one, two, or three print solenoid in accordance with the amount to be printed. The conductor from the zero contacts of relay RV does not go direct to the zero print solenoid as will be described later. The function of relay RV is such that any circuit completed to the mid springs of a contact group when the relay is deenergized, the print solenoid corresponding to the value read will be energized, so that if the relay RV is energized the nines-complement will be printed. The relay RVI is energized under control of the detector plate 124 just before writing the last digit other than zero of a negative total.

Figure 21:
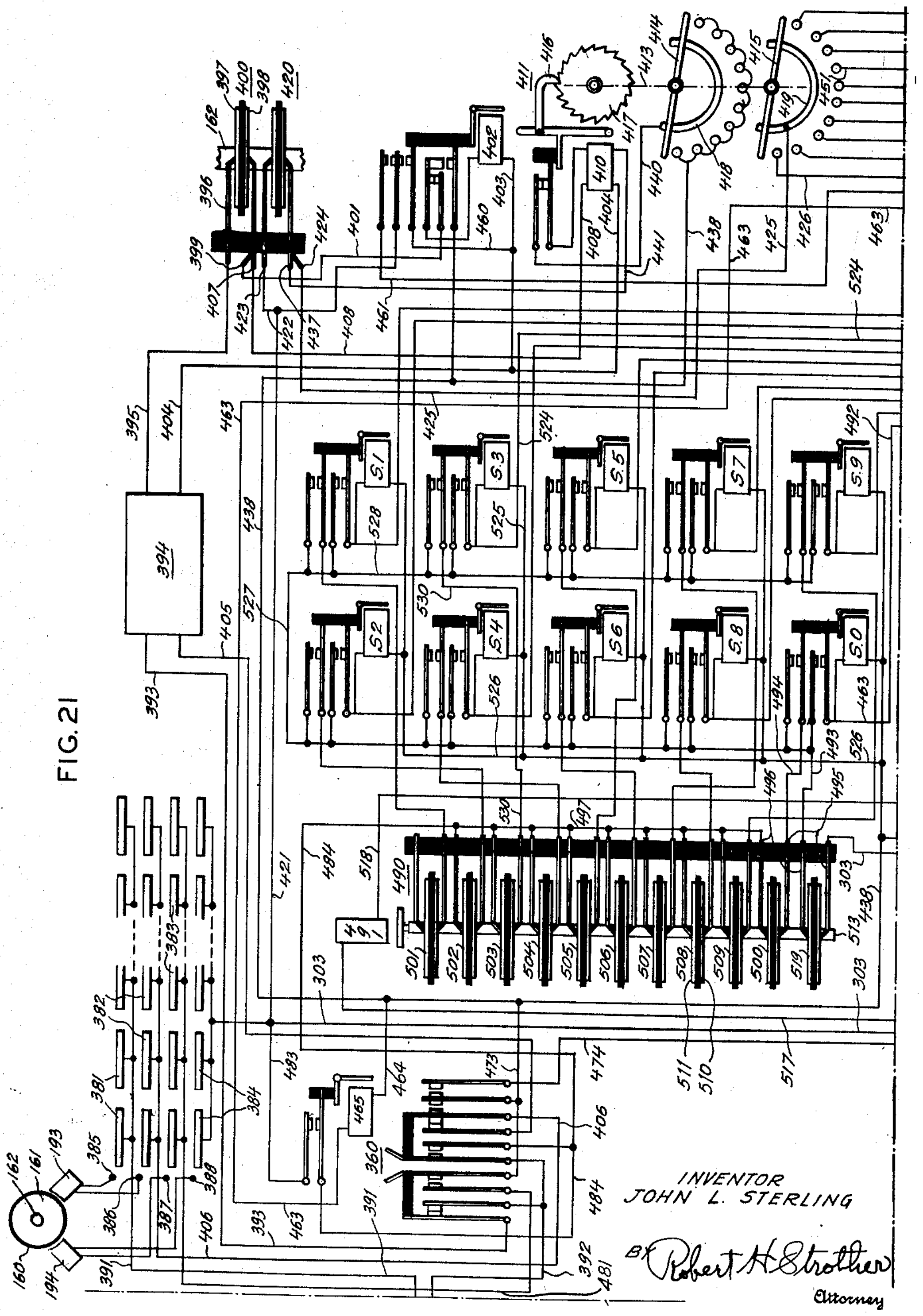
Figure 22:
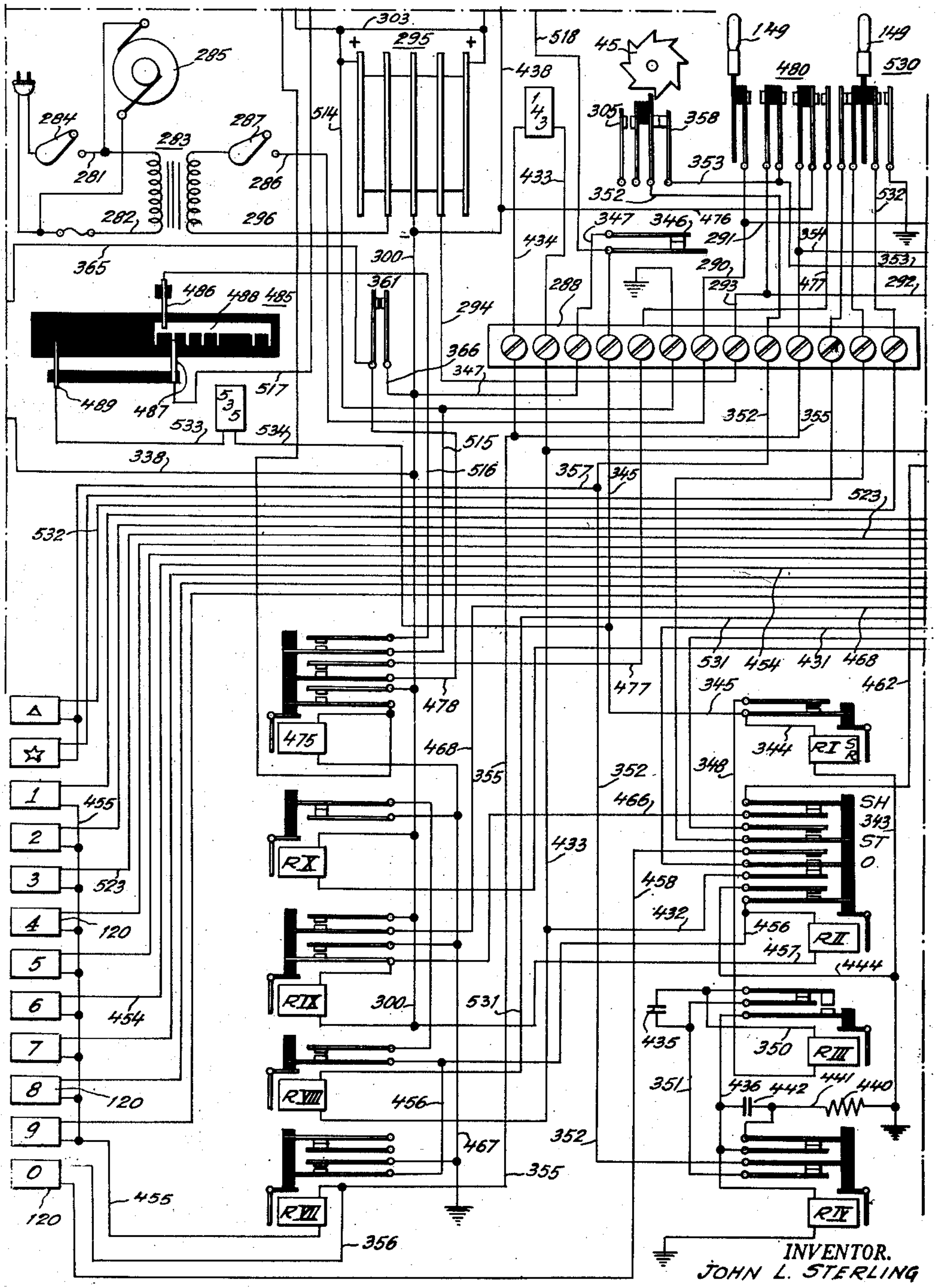

The bookkeeping machine is now in condition to receive impulses from the tape 160 representing digits in the old balance, which it will be assumed for example to be six hundred and one dollars and eighty cents. Referring to Figs. 10, 12, and 21 it will be noted that there are four contact rails 381, 382, 383, and 384 mounted on the side frames 163. Also secured to the frames 174 of each selecting carriage 172 are four contact shoes 385, 386, 387, and 388. These rails and shoes carry the circuits for the reading and recording coil 193 and the erasing coil 194. When the carriage 172 is in the home or normal position, i. e., with the magnetic head 173 positioned opposite a gap between groups of discs 161, the recording, reading, and erasing circuits are open. However, when any carriage, and only one can be moved at one time, leaves the home position, these circuits are set up for that particular head. With the head rocked as described above and the reading and recording key 360 set in the reading position, i. e., that of Fig. 21, the following circuits will be closed for transmitting one impulse representing a negative balance, if such should stand in the tape: From the coil 193 of the reading magnet to shoe 385, rail 381, lead 391 through a commutator 390 secured to and rotated by shaft 162, lead 392, outer left hand contact of key 360, lead 393, through the amplifier 394, lead 395, brush 396, common disc 397 and segmented disc 398 and brush 399 of commutator 400, also secured to and rotated by shaft 162, lead 401, through the lowermost break contact and winding of relay 402, thence over leads 403 and 404, through the amplifier 394, lead 405, through the middle right hand contact of switch 360, lead 406, rail 382 and show 386 to the winding of the coil 193. The amplifier 394 is of any well known construction sufficient to amplify the weak signals from the coil 193 to such an extent that they are capable of actuating the relay 402, or a stepping switch as will be described later. The commutators 400 and 420 are similar in construction to commutators 320 to 329, inclusive, described above, and their formation is shown in Fig. 27. The segmented disc 398 is so formed that the circuit to the relay 402 is closed only during the first six degrees of rotation of shaft 162 to permit the signal denoting whether a balance is negative or positive to be transmitted. After that the normal circuit, which will be described, is closed from the amplifier to a stepping switch controlling the print solenoids. An impulse is transmitted only if a negative balance is in the tape 160. It will be assumed at this time, however, that the balance is positive therefore no impulse is received. Commutator 420 is used to time the reading of impulses and, since it is secured to shaft 162 will rotate in synchronism therewith. As heretofore mentioned the balances may contain a maximum of six digits. Since a maximum of ten impulses is required to record a digit, the commutator would normally be divided into six equal segments of sixty degrees. It being necessary, however, to indicate to the bookkeeper whether a balance is negative or positive six degrees of the segmented disc of commutator 420 is left blank, to permit commutator 400 to control the negative or positive signal.

As the balance at this time is positive no signal of algebraic quantity was given. Therefore, the discs 161 continue to rotate through six degrees. A circuit is now closed for transmitting one impulse representing a zero, as the old balance contains only five digits (Fig. 21). From the reading coil 193 through the shoes and rails, as described above, to the amplifier and thence over lead 395, brush 396, commutator 400, brush 407, over lead 408, through one winding of motor magnet 410 for a rotary switch 411, over lead 404, through the amplifier 394, and thence back to the coil 193 as described above. This first impulse actuates the motor magnet 410 to actuate the stepping switch 411, which is of well known construction as used in automatic telephony, and is similar to that shown and described in the patent to A. H. Adams, 1,399,728, December 13, 1921. Briefly the switch comprises a shaft 413 having brushes 414 and 415 secured thereon, but insulated therefrom which is rotated counterclockwise by a pawl 416 and ratchet 417 actuated by the motor magnet 410. The brushes wipe over a plurality of contacts mounted in arcuate banks. In the particular instance shown two banks are used, one for circuit closure and the other for controlling the operation of the switch. In the circuit closure bank the contacts are wired individually to the bookkeeper, as will be described later. In the switch control bank the contacts are wired to a common circuit. The motor magnet is double wound one winding being connected to the amplifier as described above and used to step the brushes one step at a time. The other winding is cyclically operated as will be described, to restore the switch to normal. It will be noted that in normal position neither end of either brush is on a contact. Common segments 418 and 419 carry the circuits to the brushes. The operation is such that an impulse from the tape 160 operates the motor magnet 410 to step the switch once. Thus the one pulse representing a space or zero having been received, the switch will move one step with its brushes on the first contact.

A circuit is now closed from the positive leg of the rectifier, over leads 303, 421, and 422, through brush 423, commutator 420, brush 424, over lead 425, segment 419 and brush 415 of the rotary switch 411, the first contact, over lead 426, through the terminal board 377, over lead 427 to the zero contact of the total read out device. However, since this device is not electrically connected with the carriage in the old balance position, the circuit continues from the zero terminal of the board 377, over lead 428, through the zero break contact of the relay RVI which is normal, over lead 430, through the zero break contact of relay RV which is also normal, over lead 431, through the zero break contact of relay RII (which is also normal as no impulses representing a significant digit have been received from the tape), over leads 432, 433, through the coil of space magnet 143, over leads 434, 355 and 354, right hand contact of the switch 280 which is closed, as the carriage is in the old balance position, lead 353, contact 358, lead 352, lower break contact of relay RIV, lead 351, break contact of relay RIII, lead 350, through the winding of relay RIII, lead 348, through the make contact of relay RI which is operated, lead 345, switch 346, leads 347 and 300 to the negative leg of the rectifier. This circuit operates the space magnet 143 which steps the carriage one space to the left. It also operates relay RIII which is part of a timing circuit containing relay RIV. The contacts of relay RIII are a make before combination and the relay itself is of the fast operating type to obtain instantaneous opening of the break contact. The circuit for this relay has "slow release" properties to control its operation, thereby effecting a correct timing relation between the operation of the print solenoid and the impulses from the tape 160, or the sensing fingers of the read out mechanism, and is so designed that the fast operating relay RIII is made to release slowly. This is accomplished by allowing a very small amount of current to flow through its coil after it has been virtually released. Therefore, when the relay RIII was operated above, a double holding circuit was established as follows: From ground through the winding of relay RIV, lead 436, make contact of relay RIII, lead 350, winding of relay RIII, lead 348, make contact of relay RI, lead 345, contacts 346, lead 347 and 300 to negative. The other circuit extends from ground through resistance 440, lead 441, upper break contact of relay RIV lead 436, make contact of relay RIII, lead 350, winding of relay RIII and thence to negative as traced above. Relay RIV is a high resistance, slow-release relay. The return circuit for the print solenoids 420 is quickly opened at the break contact of relay RIII and it is also opened at the lower break contacts of relay RIV. Operation of relay RIV also opens the twin circuit from ground through the upper break contacts. When the make contact of relay RIII was made a condenser 442 was charged and after the opening of the contacts of the two relays this current stored in the condenser is sufficient to cause relay RIII to release slowly, but not enough to maintain it operated. The deenergization of relay RIII opens the circuit to relay RIV which releases slowly, thus delaying the closure of the circuit for the print solenoids. The whole arrangement is to permit only momentary operation of the print solenoids, but yet allow time for the entry of an amount into the totalizer. In this case however, since a space was signaled the circuit had no effect.

The shaft 162 has now rotated approximately 64 degrees, bringing the brush 437 associated with commutator 420 into contact with a segment which closes the circuit for restoring the rotary switch 411 to normal. This circuit is traced from negative, over leads 300, and 438 to the wired contacts of the rotary switch, through the brush 414 which is at rest on the first contact, segment 418, over lead 440 through the break contacts and second winding of the motor magnet 410, over lead 441 through brush 437, commutator 420, brush 423, over leads 422, 421, and 303 to the positive leg of the rectifier. This circuit steps the brush 414 to the next contact and the operation of the motor magnet opens its break contact, opening the circuit. The release of the motor magnet immediately remakes the break contacts and closes the operating circuit to step the switch to the next contact. This operation continues until the switch is restored to normal, i. e., with the brushes out of engagement with all contacts.

The commutator 420 and disc 161 have by now been rotated approximately 65 degrees, bringing that portion of the tape 160 containing the second digit impulses into position to be sensed. The second digit will be assumed to be a six. Therefore, seven impulses will be sent through the amplifier and over the circuit traced above to operate the motor magnet seven times, thus positioning brushes 414 and 415 on the seventh contact. The commutator 420 now closes a circuit from the positive leg of the rectifier over leads 303, 421, and 422, through the brush 423, commutator 420, brush 424, lead 425 to segment 419, brush 415, the seventh contact, over lead 451, terminal 6 on the board 377, lead 452, middle spring 6 of the number 6 contact of relay RVI, over leads 453, through the break contact 6 of relay RV, lead 454 to the six print solenoid 120 over lead 455 through the winding of relay RVII over leads 355 and 354 through contacts of switch 280 over lead 353, contacts 358, lead 352, the lower contact of relay RIV, lead 351, through the break contact of relay RIII, lead 350, through the winding of relay RIII, lead 348, through the contacts of relay RI, lead 345, contacts 346, leads 347 and 300 to the negative leg of the rectifier. This circuit operates the six print solenoid 120 which prints a six and enters a six in the OB vertical totalizer 85 and the cross totalizer 90. Relay RVII which is the significant digit relay is also operated and closes a circuit from ground through its lowermost make contact over lead 456 through the winding of relay RII, over leads 457 and 300 to the negative leg of the rectifier. Relay RII operates and locks up over a circuit from ground, over leads 343 and 444, through its lowermost make contact and winding, over conductors 457 and 300 to the negative leg of the rectifier. This relay remains locked up until the end of the printing of the old balance, at which time the rectifier is deenergized by the opening of switch 280.

Immediately after the print solenoid was operated the rotary switch 411 was restored to normal, as described above, by commutator 420. The next digit to be sensed in the old balance is a zero, which is represented by a single impulse from the tape 160. This impulse will set the rotary switch to its first contact, and a circuit will be closed as follows: From the positive leg of the rectifier over leads 303, 421, and 422, through brush 423, commutator 420, brush 424, lead 425, segment 419, brush 415, first contact of the lower bank of switch 411, over lead 426, zero terminal of block 377, over lead 428 to the middle spring of the zero contact of relay RVI, over lead 430 to the zero contact of relay RV, lead 431, zero make contact of relay RII which is now operated, over lead 458, through the winding of the zero print solenoid 120, over leads 356, 355, and 354 through the right hand contact of switch 280 over lead 353, contact 358, lead 352, through the lower break contact of relay RIV, over lead 351 to negative, as described above. The remainder of the digits in the old balance are entered in the same manner over similar circuits. At the end of the writing of the old balance the bookkeeper carriage steps out of the old balance reading position and the cam 148A opens the switch 280, thus disconnecting A. C. from the rectifier and releasing relays RI, RII, RIII, and RIV.

If the old balance in the tape had been negative, a signal is given as stated above which is the first impulse transmitted from the tape. This signal is received from the amplifier over lead 395, brush 396, commutator 400, brush 399, lead 401, lowermost break contact and winding of relay 402, leads 403 and 404, back to the amplifier. This impulse operates relay 402 which locks up over a circuit from negative, over leads 300 and 438, through the lowermost make contact and winding of relay 402, leads 403 and 460, through the lower middle make contact of relay 402 leads 422, 421, and 303 to the positive leg of the rectifier. Relay 402 also closes a circuit from positive conductor 422 through the upper make contact of relay 402, lead 461 to the SH terminal of block 377, over lead 462 through the SH contacts of relay RII which are closed, as the relay has not been operated at this time, over lead 466, through the winding of relay RIX, to negative over lead 300. This operates the relay RIX which locks up over a circuit from ground over lead 467, lowermost make contact and winding of relay RIX to negative over the lead 300. This relay remains locked up until the carriage moves out of the old balance position. Relay RIX closes a circuit from negative over lead 300 through the upper make contact of relay RIX over leads 468 and 470 through the winding of relay RV to ground, operating this relay which shifts its contacts to cause the printing of a negative balance as a true number. It should be noted here that when a negative amount is entered in the tape 160 it is entered as a complement of the number. Obviously, when the number is read out as it now is to be, it is desired that it be printed on the ledger as a true amount. Also, it is desirable that it be printed in some distinctive manner, such as, italics or in red. This requires a shift of the carriage. Relay RV controls a dog 471 for a cam 472 which shifts the carriage. The specific mechanism for shifting the carriage and printing a true number is fully described in Roggehstein patent referred to above and need not be described herein. In order that the amount which is a complementary number in the tape and entered in the totalizer OB as a true number, will be entered in the cross totalizer 90 as a complementary number, the same cam 472 rocks the correction key 99 (Fig. 1) which reverses the setting of the cam 104 on the vertical totalizer OB to a subtract position, thus causing the amount to be entered in the cross totalizer as a complement.

The operator now tabulates the carriage either to the withdrawal or deposit column, depending upon the transaction, and enters the amount. If a withdrawal, the amount is entered in the vertical totalizer CR which subtracts a similar amount from the cross totalizer 90 thus reducing the old balance by that amount. If the amount to be entered is a deposit, the carriage is tabulated to the position of the vertical totalizer DR. The cam 104 of this totalizer is so set that the amount is added to the old balance in the cross totalizer. After each entry in a vertical totalizer the carriage is tabulated by the operator to the balance read out position in which the dummy vertical totalizer ST causes the balance to be printed but not cleared out of the cross totalizer by the total read out mechanism. When all of the items have been entered in the statement and the final balance read out, the operator tabulates the carriage to the position of the vertical totalizer T which causes the cross totalizer to actuate the read out mechanism and, due to the fact that the vertical totalizer T is set for addition, the balance is subtracted, leaving the cross totalizer 90 cleared, i. e., standing at zero. As the balance is read out it is entered in the tape 160.

Before tabulating to the balance read out position the operator depresses the reading, recording and erasing key 360 which opens the reading circuits and closes the recording and erasing circuits and also prepares a circuit for starting the rotation of shafts 162 carrying the discs 161, commutators 390, 400 and 420. This circuit is traced from negative over leads 300, 438, and 473 through the outermost right hand contact of key 360 over lead 474, through the winding of relay 475, lead 467, to ground. When the switch 480 closes as the carriage reaches the balance read out position the rectifier 295 is connected to the A. C. source as described above for switch 280 and the circuit just described is completed at the left hand contact of switch 480 to operate the relay 475. Relay 475 locks up over a circuit from ground over lead 467 through the winding and lowermost contact of relay 475, over lead 300 to negative. This relay also closes a circuit from negative over leads 300, 438 and 475, through the right hand contact of switch 480, lead 477, through the lower middle make contact of relay 475, over lead 478 to but not through the start key 361 which is open, over lead 365 thence through the winding of relay RHC, lead 364, through the winding of magnetically operated clutch 168, over lead 363, through the right hand contact of the "three hundreds" switch 275, over leads 362 and 342 to ground. The relay RHC closes a circuit for actuating the solenoid 375 which rocks the magnetic head 173 into active position and the clutch 168 which starts the discs 161 rotating as described above. Relay RHC locks up over a circuit similar to that described above during the reading of the old balance. This circuit remains closed during the recording of the new balance.

The key 360 closes the following erasing circuit, which is traced from negative, over leads 300, 438 and 473, through the right hand one of the left hand contacts of key 360, lead 481, rail 383, shoe 387, through the winding of the erase coil 194, shoe 388, rail 384, over conductor 303 to positive. It will be noted that the current is flowing through this coil in the opposite direction to that of coil 193, thus erasing the signals already on the tape and also the coil 194 is placed ahead of the coil 193 in the direction of rotation of disc 161, so that the tape 160 is erased before a new balance is entered.

The start relay RI is immediately operated as described, and provides negative current for the print solenoids 120 and the control relays. The machine is now in condition to record the balance read out of the totalizer T. As previously described totalizer wheels 106 (Figs. 6, 7) position teeth 109 in accordance with the amount in the totalizer. These teeth actuate the sensing fingers 117 as the totalizer is stepped to the right one step at a time, permitting the fingers to close circuits for actuating the print solenoids 120. At the same time circuits now to be traced close circuits for recording the total in the tape 160.

It will be recalled that a disc 110 provided with fifteen teeth 113 is positioned by the totalizer to indicate a negative total or account overdrawn. These teeth actuate a sensing finger 127 thereby closing a circuit (Figs. 18, 19, 20, 21, 22, 23) from ground on the totalizer finger 127 leads 482, 462 and 463, through the winding of relay 465 over leads 464, 438 and 300 to negative. Relay 465 operates and closes a circuit from positive over leads 303 and 483 through the make contact of relay 465, lead 484 through the left hand one of the right hand contacts of key 360 over lead 392 through commutator 390, lead 391, rail 381, shoe 385 through the winding of recording coil 193, shoe 386, rail 382, lead 406, through the right hand middle one of the right hand contacts of key 360, over leads 473, 438 and 300 to negative. This circuit places an impulse on the tape 160 indicating a negative balance. Should the balance be positive no signal is given and relay 465 is not operated. Relay 465 remains operated only long enough to insure that the negative signal impulse is transmitted to the tape 160. This interval is determined by the totalizer 90 which steps through the shift position automatically, thus breaking the contact between the teeth 113 and the sensing finger 127.

It will be assumed, as an example, that the new balance is three hundred and ten dollars and fifty two cents as shown in Fig. 30 after a deposit of one hundred and fifty dollars and a withdrawal in four items of four hundred and forty-one dollars and twenty-eight cents. Due to the fact that this is a positive total no signal is given in the first six degrees of the tape, which will continue to rotate until the position for the first digit is reached. By this time the totalizer has stepped to the first digit position, which is a space or blank. This will be indicated by one impulse on the tape and cause the bookkeeper to step as the magnet is operated, as described above, when a zero is received from the totalizer 90 before a significant digit is printed. The teeth 109 on the first digit wheel will stand at zero and it will, therefore, close a circuit (Figs. 21, 22, 23) from ground through a sensing finger 117 over leads 427 and 428, through the zero break contact of relay RVI over lead 430, through the zero break contact of relay RV, over lead 431, through the zero break contact of relay RII, over leads 432 and 433, through the winding of the space magnet 143, over leads 434 and 355, through the middle contacts of switch 480 which are now closed, over lead 353, through the contact 358 controlled by the escapement ratchet wheel 45, over lead 352, through the lower break contact of relay RIV, over lead 351, break contact of relay RIII, lead 350, through the winding of relay RIII, lead 348, make contact of relay RI which is closed, lead 345, through the contact 346, and thence to negative over leads 347 and 300. This circuit operates the space magnet and starts the timing relays RIII and RIV to operate alternately. Simultaneously, a circuit is closed through a commutator 485 (see Fig. 22) secured to the frame of the bookkeeping machine. Brushes 486 and 487 are secured to the carriage of the bookkeeper in alignment with the total read-out position, brush 486 contacting a common bar 488 and brush 487 contacting segments of bar 488. The segments are spaced to align with the digit positions of the totalizer and control the one revolution clutch 491 for the pulsing unit 490 (Fig. 21). Each time the totalizer 90 reaches a digit position the clutch 491 is actuated over a circuit from positive, leads 303, 514 and 515, through the upper make contact of relay 475, over lead 516, through brush 486, commutator plate 438 and second segment from the left of commutator 485, brush 487, lead 517, through the winding of one revolution clutch 491, over leads 518, contacts 346, lead 347, and 300 to negative.

Paralleling the circuit traced above for operating the space magnet is a circuit from ground over sensing finger 117, leads 427, 492 and 463 through the winding of zero signal relay SO to negative over leads 438 and 300. Relay SO locks up over a circuit from negative over leads 300 and 438 through the winding and lower make contact of relay SO, over lead 493, brush 496, through commutator 519, brush 495, lead 303 to positive. This circuit is maintained by commutator 519 (Figs. 21 and 26) and holds relay SO operated until just before the end of a complete revolution of the pulsing unit 490. Relay SO also closes a circuit from positive lead 493, through its upper make contact, over lead 494 to brush 495 of the zero commutator 500 of the pulsing unit 490, brush 496, over lead 484, to the left hand one of the right hand contacts of key 360, over conductor 392, through commutator 390, lead 391, rail 381, shoe 385, winding of coil 193, shoe 386, rail 382, lead 406, through the right hand middle one of the right hand contacts of key 360, over leads 473, 438 and 300 to negative. This circuit passing through the zero commutator of the pulsing unit 490, causes the entry of one impulse representing a zero in the tape 160.

The pulsing unit 490 is similar to pulsing unit 310 described above. The disc 519 is similar to disc 314 and segmented disc 501 is similar to disc 315. There are eleven commutators 500 to 509, inclusive, and 519 (Fig. 26) mounted on a sleeve 512 secured on a shaft 513. The shaft 513 is driven through clutch 491 and a gear train 497 having a ratio of six to one by the main vertical shaft 166 in the storage unit.

The bookkeeper carriage now steps to the next digit position wherein the totalizer 90 stands at three. The tooth 109 on this wheel closes a circuit from ground through the sensing finger 117, over leads 520 and 521, through the "three" break contact of relay RVI, over lead 522, through the "three" break contact of relay RV, over lead 523, through the winding of the "three" print solenoid 120, lead 455, winding of relay RVII lead 355, middle contact of switch 480, lead 353, through contact 358, lead 352, and thence through the timing relays RIII and RIV and relay RI to negative as traced above. This causes the printing of the total on the ledger and the clearing of the totalizer wheel.

Paralleling this circuit is one extending from ground over leads 520 and 524, through the winding of relay S3, thence over leads 525, 526, 438, and 300 to negative. The relay S3 locks up over a circuit similar to that described for relay S0. The upper make contacts of relay S3 close a circuit from positive as traced above through the commutator 519, leads 493, 527, through the upper make contact of relay S3, over lead 530, through commutator 503, lead 484, through the left hand one of the right hand contacts of key 360, lead 392, commutator 390, lead 391, rail 381, shoe 385, winding of coil 193, shoe 386, rail 382, lead 406, through the right hand middle one of the right hand contacts of key 360, over leads 473, 438, and 300 to negative. This circuit through the medium of commutator 503 actuates recording coil 193 four times, thus impressing four magnetic impulses on the tape 160, representing a three. After the tape 160 has been rotated the necessary fifty-nine degrees to enter the second digit, i. e., three, the totalizer 90 steps to the next position in which the wheels stand at a one. The tooth 109 completes a circuit similar to that above through the relay S1 and the commutator 501 which transmits two impulses to the coil 193, thus impressing two magnetic impulses on the tape to designate a one. The zero is next transmitted as one impulse, and printed as a zero, as described above, during reading. The next position on the totalizer is the decimal position at which a tooth 142 is located. This tooth closes a circuit from ground through the tooth over lead 531, through the winding of relay RVIII, lead 433, through the winding of the space magnet 143, leads 434 and 355 through the middle contact of contacts 480, lead 353, contact 358, lead 352 and thence over the negative circuit traced through the contacts of relays RI, RIII, and RIV. This actuates the space magnet stepping the bookkeeper carriage over the decimal position. It will be noted that there is no segment on plate 488 of commutator 485, therefore, the clutch magnet for the pulsing unit 490 is not operated. The carriage continues to step and the remainder of the digits of the total are read out. As the carriage steps from the last digit a cam 148D closes the switch 530, which closes a circuit from ground through the right hand contact of switch 530, over lead 532 through the winding of the triangle symbol solenoid, thus printing a signal to indicate that the totalizer has been read and cleared. This symbol is not transmitted to the tape 160, due to the fact that the bookkeeping carriage step-out of the total writing position brush 487 moves off of commutator 485, thus preventing the operation of the pulsing unit 490. At the same time that brush 487 moves off of the segment 488 of the commutator 485 a brush 489 moves onto the first segment of the commutator 485. This closes a circuit from positive over leads 303, 514 and 515 through the upper make contact of relay 475, lead 516, through brush 486, commutator 488, brush 489, lead 533, through the winding of the magnet controlling one revolution clutch 535, leads 534, and 345, through contact 346, leads 347 and 300 to negative. This circuit operates the clutch magnet 535 for operating the mechanism for returning the selecting carriage 172 to normal. This mechanism is shown in Figs. 10, 10A, 11, 11A, and will be described later. As the carriage of the bookkeeper moves out of the total writing position the switch 480 is maintained operated until after the clear symbol is printed. Immediately thereafter the switch is opened disconnecting the rectifier from the A. C. source. This releases all operated and locked up relays including relay RI which is a slow release relay and, therefore, maintains, the negative current through the commutator 485 to operate the magnetic clutch on the selecting carriage. Just prior to this operation the opening of the locking circuit for the relay RCH by the rectifier permits the magnet 375 to release, thus rocking the selected reading recording and erasing head 173 away from the tape 160. As the bookkeeping carriage returns to normal it opens, and holds open throughout its return movement, the contact 346, thus removing negative current which is again supplied as the carriage again closes switches 530, 480 or 280. This prevents any false operation of the relays and magnets of the circuit.

The selecting carriage return mechanism comprises, Figs. 10, 10A, 11, 11A, a pair of bars 540 common to each row of discs 161, mounted for horizontal reciprocation. Adjustably secured to the upper surface of each bar 540 are ten fingers 542, one for each selecting carriage. The bars are drawn to the right by a spring 543 secured to frame 163 and a cross piece 541 mounted between bars 540. The bars are driven to the left or restoring position by a vertical shaft 544 geared to the main vertical shaft 166 through gears 550, 551, sleeve 552, and a one revolution clutch 537 operated by magnet 535. The vertical shaft 544 is in turn connected through a gear train including a worm wheel 545, worm 546, a shaft 553 having mounted thereon a pair of conventional ball clutches 554 and gears 547 which meshes with rack teeth 548 formed on the top of the bars 540. In normal position the bar is held by spring 543 against the frame 163 by a limit stop 556, and the fingers 542 are positioned out of the path of the carriages 172. When the clutch magnet 535 is actuated the shaft 545 through each associated gear train will drive all bars 540 to the left and any carriage 172 out of home position will be picked up and carried back to normal. By means of the one-way ball clutches 554, gears 547 are released from shaft 553 and spring 543 can thereby restore bars 540 to their right hand positions. Thus the mechanism of the invention is all restored to normal, ready for another transaction on the bookkeeper.

What I claim as new, and desire to secure by Letters Patent is:

1. In a business machine of the character described, the combination of a letter-feedable carriage carrying accumulators, means including actuators for said accumulators, a plurality of magnetic tapes on each of which a balance is recorded by magnetic impulses, cooperative with a sensing means for selecting one of said plurality of tapes carrying a particular balance and a second sensing means for sensing said impulses for controlling said actuators to enter said balance.

2. In a business machine, the combination of a set of numeral value actuators for an accumulator, a letter-feedable carriage carrying said accumulators, a set of numeral types cooperating with said actuators for printing an amount digit by digit as entered in said accumulators, with a plurality of magnetic tapes on each of which amounts are recorded by codal representations, means for selectively sensing said tapes, means operable at a predetermined zone of letter feed of said carriage for actuating said sensing means to operate said actuators and type to enter in said accumulator and print on a work sheet the amount sensed.

3. In a business machine, the combination of a set of numeral value actuators for an accumulator, a letter-feedable carriage carrying an accumulator, a set of numeral types cooperating with said actuators for printing an amount entered in said accumulator, with a plurality of magnetic tapes on each of which amounts are recorded by magnetic impulses, means for selecting a particular one of said tapes, means for sensing said impulses thereon, circuit means selectively operable in a predetermined zone of letter feed of said carriage for connecting said sensing means, and means to operate said actuators and type to enter in said accumulators and print on a work sheet the amount sensed.

4. In a business machine of the character described, the combination of a magnetic recording device comprising a magnetizable medium containing magnetic impulses representative of the digits of an amount, a reading head, a letter-feedable carriage having accumulators mounted thereon and typing instrumentalities and actuators for said accumulators associated therewith, means for operating said typing instrumentalities, and actuators cooperative with a selector having a contact thereon for each digit, said selector being actuated by impulses from said reading head to complete a circuit for energizing said operating means in accordance with the number of impulses representative of a digit received from said head, whereby said digit is printed and the amount representative of the digit is entered in said accumulator.

5. In a business machine of the character described, the combination of a plurality of magnetic recording devices containing impulses representing digits of an amount, said recording devices being arranged in groups, a reading head associated with each group, means for selecting and stepping said reading head into active relation with one of said recording devices in a group, cooperative with a letter-feedable paper carriage having accumulators thereon, typing instrumentalities and actuators for said accumulators associated with said carriage, means for operating said typing instrumentalities and actuators, and circuit means comprising a selector controlled by impulses from said reading head, said selector completing a circuit from said reading head to said operating means whereby said amount is printed digit by digit and entered in said accumulators.

6. In a business machine of the character described, the combination of a plurality of magnetizable tapes containing magnetic impulses representing digits of an amount each being mounted on a disc and rotatable thereby, said tapes being arranged in groups, a magnetic reading head associated with each graup, said head being mounted on a carriage adapted for step by step movement with relation to said group, circuit means for selecting and stepping said carriage and head into active relation with one of said tapes in a group, cooperative with a letter-feedable paper carriage having accumulators thereon, typing instrumentalities and actuators for said accumulators associated therewith, print solenoids for controlling the actuation of said typing instrumentalities and actuators, and circuit means effective at a predetermined zone of letter feed travel of said paper carriage comprising a stepping switch controlled by impulses from said reading head, said switch completing a circuit from said reading head to one of said print solenoids whereby said amount is printed digit by digit and entered in said accumulators.

7. In a business machine of the character described, the combination of a plurality of magnetic recording devices containing impulses representing digits of an amount, said recording devices being arranged in groups, a reading head associated with each group, said head being mounted on a carriage adapted for step by step movement with relation to said group, means for selecting and stepping said carriage and head into active relation with one of said recording devices in a group, cooperative with a letter-feedable paper carriage having accumulators thereon, typing instrumentalities and actuators for said accumulators associated therewith, print solenoids for controlling the actuation of said typing instrumentalities and actuators, and circuit means effective at a predetermined zone of letter feed travel of said paper carriage comprising a selector controlled by impulses from said reading head, said selector completing a circuit from said reading head to one of said print solenoids whereby said amount is printed digit by digit and entered in said accumulators.

8. In a business machine of the character described, the combination of a plurality of magnetisable tapes containing magnetic impulses representing digits of an amount each being mounted on a disc and rotatable thereby, said tapes being arranged in groups, a magnetic reading head associated with each group, said head being mounted on a carriage adapted for step by step movement with relation to said group, circuit means for selecting and stepping said carriage and head into active relation with one of said tapes in a group, cooperative with a letter-feedable paper carriage having accumulators thereon, typing instrumentalities and actuators for said accumulators associated therewith, means for operating said typing instrumentalities and actuators, and circuit means comprising a selector controlled by impulses from said reading head, said selector completing a circuit from said reading head to said operating means whereby said amount is printed digit by digit and entered in said accumulators.

9. In a business machine of the character described, the combination of a plurality of magnetizable members, said members being arranged in groups, a magnetic recording head associated with each group, means for selecting and stepping said head into active relation with one of said members, cooperative with a letter-feedable paper carriage having accumulators mounted thereon, typing instrumentalities associated with said paper carriage, a work sheet on said carriage, means for operating said typing instrumentalities, and a read-out device comprising means settable by said accumulators for indicating an amount standing therein, means for sensing said setting, said sensing means completing a circuit to said recording head for entering said amount in the form of impulses in said member and completing a circuit to said typing instrumentalities to print said amount digit by digit on said work sheet.

10. In a business machine of the character described, the combination of a plurality of magnetizable tapes each mounted on a disc and rotatable thereby, said tapes being arranged in groups, a magnetic recording head associated with each group, said head being mounted in a carriage adapted for step by step movement with relation to said group, circuit means for selecting and stepping said carriage and head into active relation with one of said tapes in a group, cooperative with a letter-feedable paper carriage having accumulators mounted thereon, typing instrumentalities associated with said paper carriage, a work sheet on said paper carriage, a cross totalizer controlled by said accumulators, print solenoids for operating said typing instrumentalities, and a read-out device comprising means settable by said cross totalizer for indicating an amount standing therein, electrical means for sensing said setting, said sensing means completing a circuit through a pulsing device to said recording head for entering said amount in the form of magnetic impulses in said tape and completing a circuit to said typing instrumentalities to print said amount on said work sheet.

11. In a business machine of the character described, the combination of a plurality of magnetizable tapes each mounted on a disc and rotatable thereby, said tapes being arranged in groups, a magnetic recording head associated with each group, means for selecting and stepping said head into active relation with one of said tapes in a group, cooperative with a letter-feedable paper carriage having accumulators mounted thereon, typing instrumentalities associated with said paper carriage, a work sheet on said carriage, print solenoids for operating said typing instrumentalities, and a read-out device comprising means settable by said accumulators for indicating an amount standing therein, means for sensing said setting, said sensing means completing a circuit to said recording head for entering said amount in the form of magnetic impulses in said tape and completing a circuit to said typing instrumentalities to print said amount digit by digit on said work sheet.

12. In a business machine of the character described, the combination of a plurality of magnetizable members, said members being arranged in groups, a magnetic recording head associated with each group, said head being mounted in a carriage adapted for step by step movement with relation to said group, circuit means for selecting and stepping said carriage and head into active relation with one of said members in a group, cooperative with a letter-feedable paper carriage having accumulators mounted thereon, typing instrumentalities associated with said paper carriage, a work sheet on said paper carriage, means for operating said typing instrumentalities, and a read-out device comprising means settable by said accumulators for indicating a digit standing therein, electrical means for sensing said setting, said sensing means completing a circuit through a pulsing device to said recording head for entering said amount in the form of magnetic impulses in said member and completing a circuit to said typing instrumentalities to print said digit on said work sheet.

13. In a business machine of the character described, the combination of a letter-feedable carriage carrying accumulators, means including typing instrumentalities and actuators for said accumulators, cooperative with a plurality of magnetic tapes each carrying impulses representative of the digit of a balance, a plurality of means for reading said impulses to control said actuators, a work sheet on said carriage, codal representations in said work sheet, means for sensing said codal representations, and means cooperating with said sensing means for selecting one of said plurality of reading means and tapes.

14. In a magnetic recording system, a plurality of magnetizable units adapted to receive and retain impulses representative of a digit, said units being arranged in groups on a movable member, means for moving said member, means individual to each group carrying a reading and recording head thereon, means for effecting a step by step movement of said carrying means with relation to said units, and a sensing device adapted to sense a perforated record, said sensing device upon sensing said record being adapted to complete a circuit including, means for selecting and actuating said stepping means to position one of said heads opposite a particular unit, means for rocking said head into close proximity with the selected unit and actuating said moving means, whereby said unit is moved with relation to said head.

15. In a magnetic recording system, a plurality of magnetizable tapes adapted to receive and retain impulses representative of a digit, each tape being secured to the periphery of a rotatable disc, said discs being arranged in groups on a shaft, driving means for said shaft, a magnetic clutch for connecting said shaft and driving means, a carriage individual to each group carrying a reading and recording head movably mounted thereon, a magnet for effecting a step by step movement of said carriage with relation to said discs, an electro-mechanical sensing device comprising sensing pins adapted to sense a perforated record comprising a plurality of spring pressed pins carried in a reciprocating pin box, said pins in turn depressing set pins adapted to close switches to complete a circuit including said switches, a pulsing device for selecting and actuating said stepping magnet to position one of said heads opposite a particular disc, actuating a solenoid for rocking said head into close proximity with said selected tape and actuating said magnetic clutch to cause rotation of said discs with relation to said head.

16. In a magnetic recording system, a plurality of magnetizable tapes adapted to receive and retain impulses representative of a digit each tape being secured to the periphery of a rotatable disc, said discs being arranged in groups on a shaft, driving means for said shaft, a clutch for connecting said shaft and driving means, means individual to each group carrying a reading and recording head thereon, means for effecting a step by step movement of said carriage with relation to said discs, a sensing device adapted to sense a perforated record comprising a plurality of spring pressed pins, said pins in turn upon sensing said record closing switches to complete a circuit including a pulsing device for selecting and actuating said stepping means to position one of said heads opposite a particular disc, actuating a solenoid for rocking said head into close proximity with said selected tape and actuating said clutch to cause rotation of said disc with relation to said head.

17. In a magnetic recording system, a plurality of magnetizable units adapted to receive and retain impulses representative of a digit said units being arranged in groups on a movable member, means for moving said member, means individual to each group carrying a reading and recording head thereon, means for effecting a step by step movement of said carrying means with relation to said units, and means for selectively completing a circuit including a device for selecting and actuating said stepping means to position one of said heads opposite a particular unit, actuating means for rocking said head into close proximity with said selected unit and actuating said moving means whereby said unit is moved with relation to said head.

18. In a magnetic recording system, a plurality of magnetizable tapes adapted to receive and retain impulses representative of a digit each tape being secured to a rotatable disc, said discs being arranged in groups on a shaft, means for driving said shaft, a magnetic clutch for connecting said shaft and driving means, a carriage individual to each group carrying a reading and recording head thereon, a magnet for effecting a step by step movement of said carriage with relation to said tapes, and means for selectively completing a circuit including a pulsing device for selecting and actuating said stepping magnet to position one of said heads opposite a particular tape, actuating a solenoid for rocking said head into close proximity with said selected tape and actuating said magnetic clutch whereby said tape is rotated with respect to said head.

19. A device for storing data magnetically comprising, a plurality of magnetizable tapes, a plurality of non-magnetizable discs supporting said tapes, each of said tapes being adapted to store magnetic impulses representing a multidigit number, means for rotating said discs, means adapted to sense said impulses in said rotating tapes, means for positioning said sensing means adjacent a pre-selected tape, means for rocking said sensing means in and out of effective position, and means for restoring said positioning means to normal.

20. A device for storing data magnetically comprising, a plurality of magnetizable tapes, a plurality of non-magnetizable tape supporting discs, each of said tapes being adapted to store magnetic impulses representing a multidigit number, driving means for rotating said discs, means adapted to sense, record and erase magnetic impulses on said rotating tapes, means for stepping said sensing recording and erasing means to a pre-selected tape, means for rocking said sensing, recording and erasing means in and out of effective position, and means for restoring said sensing, recording and erasing means to normal.

21. An accounting device for storing data magnetically comprising, a plurality of magnetizable tapes and each tape representing one account, a plurality of non-magnetizable tape supporting discs, said tapes positioned in pluralities representative of groups of ten accounts, driving means for rotating said discs, means adapted to sense, record and erase magnetic impulses on said rotating tapes including a sensing and recording magnet and an erasing magnet mounted to form a unitary member, means for positioning said unitary members to a position adjacent with a pre-selected tape, means for rocking said unitary member in and out of effective position, and means for restoring said positioning means to normal.

22. A device for storing data magnetically comprising, a plurality of magnetizable tapes, a plurality of non-magnetizable tape supporting discs, a disc supporting member, driving means for rotating said member, means adapted to sense, record and erase magnetic impulses on said tapes, an electro-magnetically controlled escapement mechanism for positioning said sensing recording and erasing means to a position adjacent a pre-selected tape, means for rocking said sensing, recording and erasing means in and out of effective position, and means for restoring said positioning means to normal.

23. A device for storing data magnetically comprising, a plurality of magnetizable tapes, a plurality of non-magnetizable tape supporting discs, each of said tapes being adapted to store magnetic impulses representing a multidigit number, driving means for rotating said discs, means adapted to sense, record and erase magnetic impulses on said rotating tapes including a sensing and recording magnet and an erasing magnet mounted to form a unitary member, means for stepping said unitary members to a position adjacent a pre-selected tape, means for rocking said unitary member in and out of effective position, means for restoring said unitary member to normal, and said restoring means comprising, a plurality of racks engageable with said unitary member, a plurality of gears meshing with said racks, a driven shaft, a plurality of one-way frictionally operated clutches coupling said gears to said driven shaft, and spring means for restoring said racks to normal.

24. In a business machine of the character described, the combination of a letter-feedable carriage carrying accumulators, a magnetic tape having a plurality of magnetizable units adapted to receive and retain impulses representative of a digit, a movable member on which said units are arranged in groups, means for moving said movable member, reading and recording heads individual to each group, carrying means for said reading and recording heads, means for effecting a step by step movement of said carrying means with relation to said units and a sensing device adapted to complete a circuit including, means for selecting and actuating said stopping means to position one of said heads opposite a particular unit, means for rocking said head into close proximity with the selected unit and actuating said moving means, whereby said unit is moved with relation to said head, means including typing instrumentalities and actuators for said accumulators adapted to record information according to the information sensed by the said heads when in sensing condition and means for causing the recording head when in recording condition to record on the magnetic tapes impulses representative of the same digit as the typing instrumentalities and actuators.

JOHN L. STERLING.

References Cited in the file of this patent

UNITED STATES PATENTS

| Number | Name | Date |
|---|---|---|
| 1,930,252 | Reynolds | Oct. 10, 1933 |
| 2,080,100 | Tauschek | May 11, 1937 |
| 2,155,928 | Brand | Apr. 25, 1939 |
| 2,229,905 | Sundstrand | Jan. 28, 1941 |
| 2,338,636 | Goodrum et al. | July 4, 1944 |
| 2,416,625 | Hooper | Feb. 25, 1947 |
| 2,429,730 | Pitman | Oct. 28, 1947 |
| 2,439,446 | Begun | Apr. 13, 1948 |
| 2,453,932 | Pitman | Nov. 16, 1948 |
| 2,485,730 | Giffen et al. | Oct. 25, 1949 |
| 2,540,654 | Cohen et al. | Feb. 6, 1951 |